US009972097B2

United States Patent
Kunihiro et al.

(10) Patent No.: US 9,972,097 B2
(45) Date of Patent: May 15, 2018

(54) IMAGE PROCESSING DEVICE, METHOD, AND MEDIUM FOR CALCULATING PROPAGATION SPEED AND DIRECTION OF OBJECT PULSATIONS

(71) Applicant: SONY CORPORATION, Tokyo (JP)

(72) Inventors: Takeshi Kunihiro, Kanagawa (JP); Tomohiro Hayakawa, Saitama (JP); Eriko Matsui, Tokyo (JP); Seiji Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 14/890,561

(22) PCT Filed: Jul. 9, 2014

(86) PCT No.: PCT/JP2014/003653
§ 371 (c)(1),
(2) Date: Nov. 11, 2015

(87) PCT Pub. No.: WO2015/008459
PCT Pub. Date: Jan. 22, 2015

(65) Prior Publication Data
US 2016/0104296 A1  Apr. 14, 2016

(30) Foreign Application Priority Data
Jul. 19, 2013 (JP) .................. 2013-150434

(51) Int. Cl.
G06K 9/00 (2006.01)
G06T 7/20 (2017.01)

(52) U.S. Cl.
CPC ............ *G06T 7/20* (2013.01); *G06K 9/00127* (2013.01); *G06T 2207/10056* (2013.01); *G06T 2207/20021* (2013.01); *G06T 2207/30024* (2013.01)

(58) Field of Classification Search
CPC ............ G06T 7/20; G06T 2207/10056; G06T 2207/20021; G06T 2207/30024; G06K 9/00127
See application file for complete search history.

(56) References Cited

U.S. PATENT DOCUMENTS

| 2013/0070971 A1 | 3/2013 | Kunihiro et al. |
| 2013/0321459 A1 | 12/2013 | Hayakawa et al. |
| 2016/0163044 A1* | 6/2016 | Kunihiro ............... G01N 15/10 382/133 |

FOREIGN PATENT DOCUMENTS

| WO | WO 2011/122200 A1 | 10/2011 |
| WO | 2012/118049 A1 | 9/2012 |

OTHER PUBLICATIONS

Bursac et al., "Cardiomyocyte Cultures With Controlled Macroscopic Anisotropy A Model for Functional Electrophysiological Studies of Cardiac Muscle", Dec. 13, 2002, American Heart Association, Inc., Circulation Research 2002;91:e45-e54.*

(Continued)

*Primary Examiner* — Stephen R Koziol
*Assistant Examiner* — Timothy Choi
(74) *Attorney, Agent, or Firm* — Oblon, McClelland, Maier & Neustadt, L.L.P.

(57) ABSTRACT

An image processing device includes a processor to detect motion of objects in an observation area on the basis of a captured image. The processor also calculates amounts of each detected motion, and calculates a propagation speed, a propagation direction, or both, of the motion for pulsations of the objects.

16 Claims, 22 Drawing Sheets

(56) References Cited

OTHER PUBLICATIONS

Kunihiro et al. "Bibliographic data: WO2011122200 (A1)", Oct. 6, 2011, Espace.net, p. 1-2.*
Translated Office action dated Oct. 13, 2016 in Japanese Patent Application No. 2013-150434.*
International Search Report dated Oct. 22, 2014 for PCT/JP2014/003653 filed on Jul. 9, 2014.
European Office Action dated Mar. 29, 2017 in Patent Application No. 14 744 206.5.
Office Action dated Nov. 17, 2017 in Chinese Patent Application No. 201480039614.9, 20 pages (with English-language Translation).

* cited by examiner

IMAGE PROCESSING DEVICE, METHOD, AND MEDIUM FOR CALCULATING PROPAGATION SPEED AND DIRECTION OF OBJECT PULSATIONS

TECHNICAL FIELD

The present technology relates to an image processing device, method, and program, in particular to an image processing device, method, and program which enable to simply and noninvasively evaluate stability from propagation of each pulsation without needing special preparation.

CROSS REFERENCE TO RELATED APPLICATIONS

This application claims the benefit of Japanese Priority Patent Application JP 2013-150434 filed on Jul. 19, 2013, the entire contents of which are incorporated herein by reference.

BACKGROUND ART

In recent years, in a study of cell processes and the like, a technology called calcium (Ca) imaging is used, in which cells are colored by using a pigment (calcium fluorescent indicator) that binds to calcium ion and emits fluorescence so that the cells can be observed as image information.

In the Ca imaging, fluorescent dye that binds to Ca and emits fluorescence is introduced into cells and Ca concentration change caused by excitement of the cells can be detected, so that it is possible to visualize pulsation propagation.

Evaluation of pulsation propagation using a multi-electrode array (MEA) is also performed. In the evaluation of pulsation propagation using MEA, a potential change of extracellular membrane is detected by electrodes arranged on a bottom of a culture dish and peak times of the potential change are displayed as isochrones.

An image processing technology that enables to easily and noninvasively observe propagation of pulsation is also proposed (for example, see PTL 1).

CITATION LIST

Patent Literature

PTL 1: WO 2012/118049

SUMMARY OF INVENTION

Technical Problem

However, in the Ca imaging, an operation to fluorescence-stain the cells is complicated and further discoloration occurs. Further, the fluorescent dye may affect the cells.

Further, when the multi-electrode array is used, a special culture dish is needed and only the pulsation propagation of cells on the electrodes can be evaluated.

Further, in PTL 1, a propagation speed for each pulsation and a propagation direction are difficult to be acquired, so that it is difficult to evaluate, for example, the propagation speed for each pulsation and the propagation direction.

The present technology is disclosed in view of the above situation and enables to simply and noninvasively evaluate stability from propagation of each pulsation without needing special preparation.

Solution to Problem

In an embodiment, an image processing device includes processor circuitry configured to detect motion of objects in an observation area on the basis of a captured image, calculate amounts of each detected motion, and calculate at least one of a propagation speed and a propagation direction of the motion for pulsations of the objects.

In another embodiment, an image processing method includes detecting motion of objects in an observation area on the basis of a captured image, calculating amounts of each detected motion, and calculating at least one of a propagation speed and a propagation direction of the motion for pulsations of the objects.

In another embodiment, there is a non-transitory computer readable storage medium storing a computer program for causing a computer to function as an image processing device, the image processing device including processor circuitry configured to detect motion of objects in an observation area on the basis of a captured image, calculate amounts of each detected motion, and calculate at least one of a propagation speed and a propagation direction of the motion for pulsations of the objects.

Another aspect of the present technology is an image processing device including a motion detector that detects motion of cultured myocardial cells for each partial area in an observation area on the basis of a picked-up image, a motion amount calculator that calculates an amount of motion of each detected motion, and a propagation information calculator that calculates a propagation speed and a propagation direction of the motion for each pulsation of the cultured myocardial cells on the basis of waveform information representing a variation over time of each calculated amount of motion.

The motion detector detects the motion for each partial area in each frame of a moving image in the observation area and the propagation information calculator can generate waveform information representing pulsation of the cultured myocardial cells in the partial area on the basis of the amount of motion for each partial area in a plurality of frames of the moving image.

The propagation information calculator can calculate the propagation speed and the propagation direction for each pulsation by comparing a time corresponding to a feature point set in advance in a waveform of the waveform information in a predetermined partial area with a time corresponding to a feature point set in advance in a waveform of the waveform information in another partial area.

The image processing device can further include an evaluation unit that calculates an evaluation value evaluating stability over a plurality of pulsations of the cultured myocardial cells in the entire observation area.

The evaluation unit can evaluate at least any one of a degree of distribution of the propagation direction and the propagation speed of the pulsation, smallness of a difference between a maximum value and a minimum value of the propagation direction and the propagation speed of the pulsation, and a degree at which the propagation speed is within a certain range.

The image processing device can further include a display unit that visualizes and displays a state of the propagation of the pulsation.

The display unit can display the propagation of the pulsation as isochrones.

The display unit can display the propagation of the pulsation as a histogram.

The display unit can display the propagation speed and the propagation direction for each pulsation in association with a waveform representing the pulsation.

The display unit can display transition over time of an evaluation value evaluating stability of the pulsation.

Another aspect of the present technology is an image processing method including detecting motion of cultured myocardial cells for each partial area in an observation area on the basis of a picked-up image by a motion detector, calculating an amount of motion of each detected motion by a motion amount calculator, and calculating a propagation speed and a propagation direction of the motion for each pulsation of the cultured myocardial cells on the basis of a waveform representing each calculated amount of motion by a propagation information calculator.

Another aspect of the present technology is a program that causes a computer to function as an image processing device including a motion detector that detects motion of cultured myocardial cells for each partial area in an observation area on the basis of a picked-up image, a motion amount calculator that calculates an amount of motion of each detected motion, and a propagation information calculator that calculates a propagation speed and a propagation direction of the motion for each pulsation of the cultured myocardial cells on the basis of waveform information representing a variation over time of each calculated amount of motion.

In another aspect of the present technology, motion of cultured myocardial cells is detected for each partial area in an observation area on the basis of a picked-up image, an amount of motion of each detected motion is calculated, and a propagation speed and a propagation direction of the motion for each pulsation of the cultured myocardial cells are calculated on the basis of waveform information representing a variation over time of each calculated amount of motion.

Advantageous Effects of Invention

According to the present technology, it is possible to simply and noninvasively evaluate stability from propagation of each pulsation without needing special preparation.

DESCRIPTION OF EMBODIMENTS

Hereinafter, an embodiment of the technology disclosed here will be described with reference to the drawings.

It should be understood by those skilled in the art that various modifications, combinations, sub-combinations and alterations may occur depending on design requirements and other factors insofar as they are within the scope of the appended claims or the equivalents thereof.

For example, in regenerative medicine, various tissues and organs of a human body are treated by using cultured cells which are cell tissue produced by cultivating cells collected from a living body. Cultured myocardial cells which are cultured cells obtained by cultivating myocardial cells may be used to treat a heart. Further, the cultured myocardial cells are used to evaluate toxicity of a drug to a heart in drug development.

In a living body, the myocardial cells pulsate by repeatedly contracting and relaxing at all times. Therefore, cells of each portion of the myocardial cells move in a predetermined direction so that the myocardial cells repeat contracting and relaxing as a whole. In practice, the myocardial cells include portions that autonomously pulsate and portions that pulsate depending on pulsation of surrounding portions. In other words, the pulsation of the myocardial cells propagates.

Figure 1:
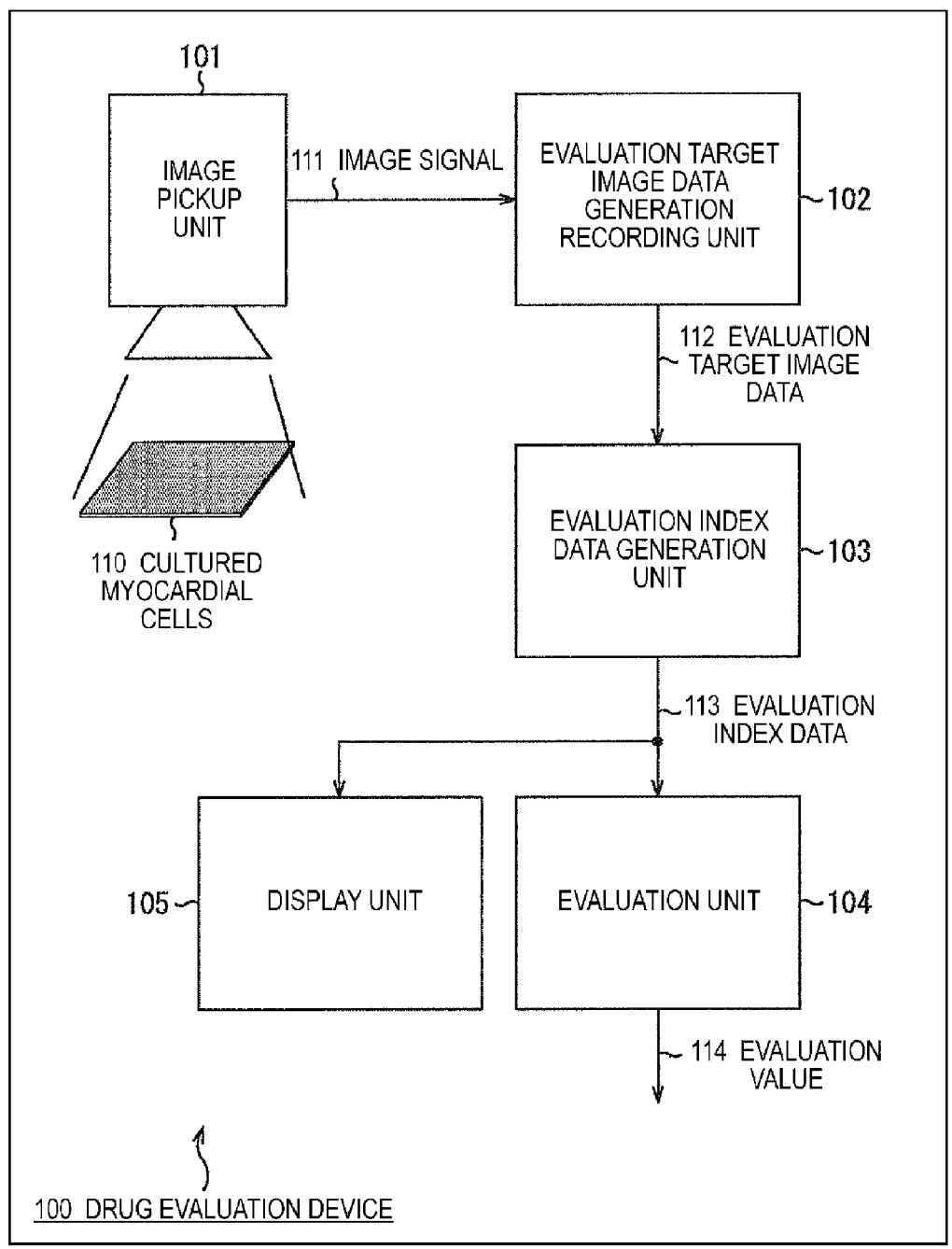
FIG. 1 is a block diagram showing a configuration example of a drug evaluation device according to an embodiment of the present technology.

FIG. 1 is a block diagram showing a configuration example of a drug evaluation device according to an embodiment of the present technology.

The drug evaluation device 100 shown in FIG. 1 is a device that evaluates a drug administered to cultured myocardial cells 110 by observing motion of the cultured myocardial cells 110. The drug evaluation device 100 includes an image pickup unit 101, an evaluation target image data generation recording unit 102, an evaluation index data generation unit 103, an evaluation unit 104, and a display unit 105.

The image pickup unit 101 picks up an image of the cultured myocardial cells 110 which are an object to be observed. The image pickup unit 101 may directly (not through another unit) pick up an image of the cultured myocardial cells 110 or may pick up an image of the cultured myocardial cells 110 through another unit such as, for example, a microscope.

The cultured myocardial cells 110 may be fixed with respect to the image pickup unit 101 or need not be fixed with respect to the image pickup unit 101. In general, the cultured myocardial cells 110 are desired to be fixed with respect to the image pickup unit 101 because the drug evaluation device 100 detects motion (temporal change of a position).

The image pickup unit 101 picks up an image of the cultured myocardial cells 110 for a predetermined period of time. In other words, the image pickup unit 101 obtains a moving image of an object that is the cultured myocardial cells 110. The image pickup unit 101 picks up an image of the cultured myocardial cells 110 before and after the drug is administered. The image pickup unit 101 may pick up an image of the cultured myocardial cells 110 a plurality of times after the drug is administered according to a predetermined condition, for example, every time a predetermined time elapses.

The image pickup unit 101 supplies an image signal 111 of an image (a moving image) of the cultured myocardial cells 110 obtained by picking up the image to the evaluation target image data generation recording unit 102.

The evaluation target image data generation recording unit 102 generates evaluation target image data based on the image signal supplied from the image pickup unit 101 and records and stores the generated evaluation target image data in, for example, a recording medium in the evaluation target image data generation recording unit 102. For example, the evaluation target image data generated here becomes moving image data generated from the image signal obtained by picking up the image of the cultured myocardial cells 110.

For example, the evaluation target image data generation recording unit 102 may extract frame images of only a certain period of time from a plurality of frame images supplied from the image pickup unit 101 and generate the evaluation target image data from the extracted frame images. Further, for example, the evaluation target image data generation recording unit 102 may extract a part of an area of each frame image supplied from the image pickup unit 101 as a small frame image and generate the evaluation target image data from a moving image including the small frame images.

Further, for example, the evaluation target image data generation recording unit 102 may perform any image processing on each frame image supplied from the image pickup unit 101 and generate the evaluation target image data from a result of the image processing. As the image processing, for example, enlargement, reduction, rotation, and deformation of an image, correction of brightness and chromaticity, sharpening, denoising, intermediate frame image generation, and the like can be considered. Of course, any image processing other than the above may be performed.

The evaluation target image data generation recording unit 102 supplies stored evaluation target image data 112 to the evaluation index data generation unit 103 at a predetermined timing or based on a request of the evaluation index data generation unit 103.

The evaluation index data generation unit 103 detects motion of an object to be observed (the cultured myocardial cells 110) for each block which each is a partial area obtained by dividing the entire area of an image of the object to be observed (the cultured myocardial cells 110) between the frame images of the supplied evaluation target image data 112.

The evaluation index data generation unit 103 represents the detected motion of each block as a motion vector and obtains the size (amount of motion) of the motion vector. Further, the evaluation index data generation unit 103 calculates propagation information described later.

The evaluation index data generation unit 103 supplies data including the propagation information to the evaluation unit 104 as evaluation index data 113.

The evaluation unit 104 calculates an evaluation value 114 to evaluate stability of pulsation of the cultured myocardial cells 110 as described later on the basis of information included in the evaluation index data 113.

The display unit 105 visualizes and displays information related to the evaluation index data 113 or the evaluation value 114.

Figure 2:
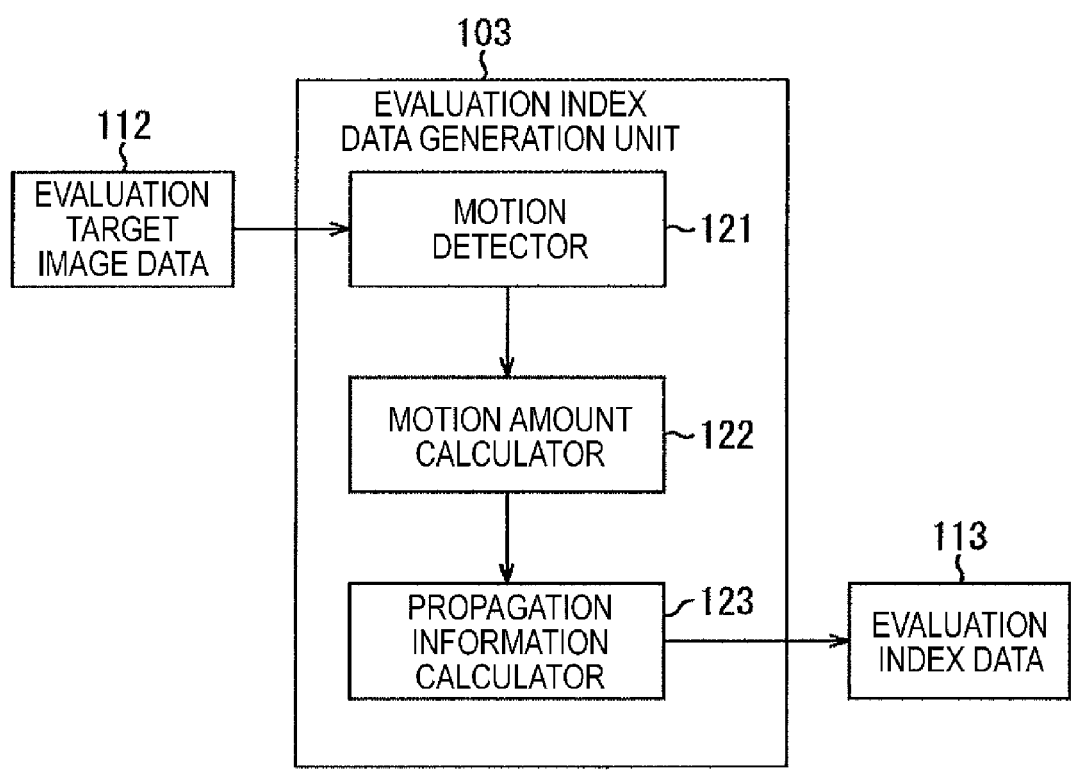
FIG. 2 is a block diagram showing a configuration example of an evaluation index data generation unit of FIG. 1.

FIG. 2 is a block diagram showing a configuration example of the evaluation index data generation unit 103 of FIG. 1. As shown in FIG. 2, the evaluation index data generation unit 103 includes a motion detector 121, a motion amount calculator 122, and a propagation information calculator 123.

The motion detector 121 receives the recorded evaluation target image data 112 from the evaluation target image data generation recording unit 102, detects motion of the block for each block, and supplies a result of the detection (motion vectors) to the motion amount calculator 122 as motion detection data described later.

As described later, the motion amount calculator 122 divides each supplied motion detection data into new blocks and calculates an average amount of motion in each block. The motion amount calculator 122 supplies the calculated average amounts of motion to the propagation information calculator 123.

The propagation information calculator 123 calculates propagation information described later and generates the evaluation index data 113 including the propagation information at a predetermined timing or based on a request of the evaluation unit 104. The generated evaluation index data 113 is supplied to the evaluation unit 104.

The motion detector 121 to the propagation information calculator 123 perform the above processes on each frame image of the evaluation target image data.

Figure 3:
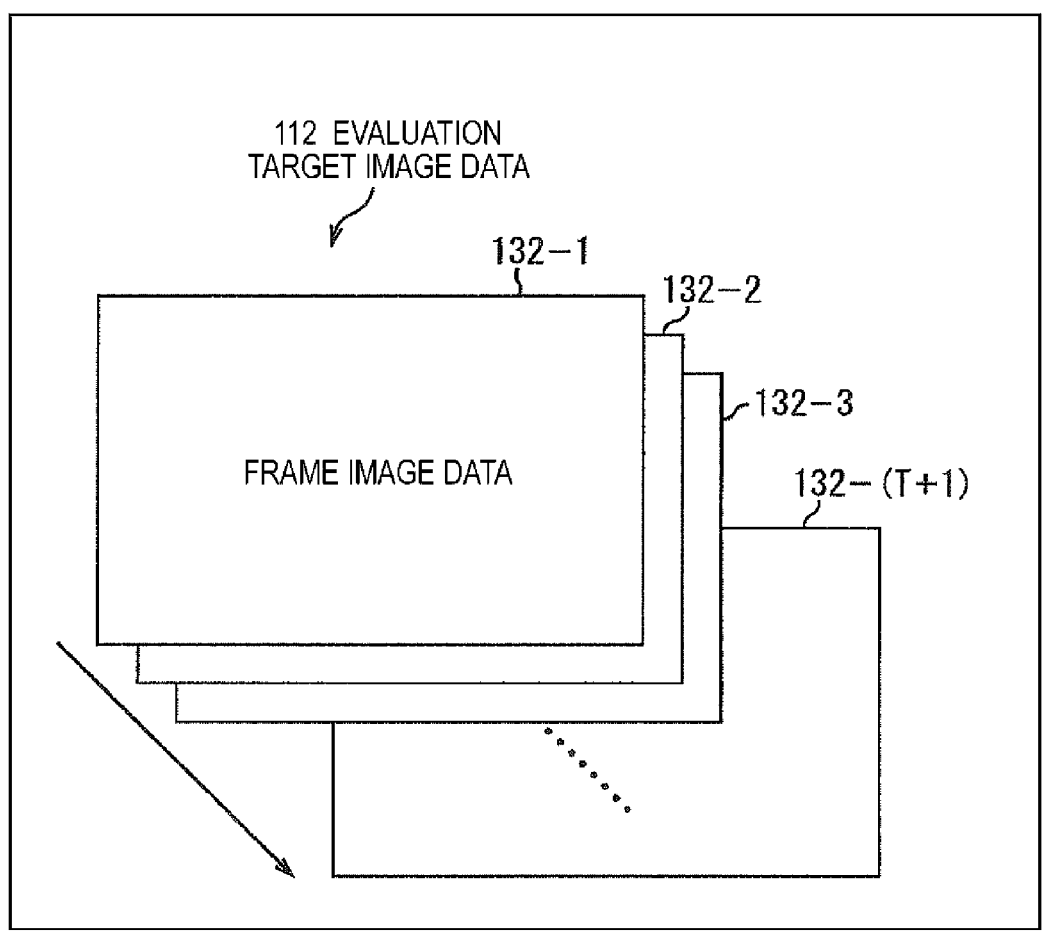
FIG. 3 is a diagram showing a structure example of evaluation target image data supplied to the evaluation index data generation unit.

FIG. 3 shows a structure example of the evaluation target image data 112 supplied to the evaluation index data generation unit 103. The image pickup is performed in a predetermined length of evaluation interval (for example, T+1 frames (T is any natural number)). In other words, the evaluation target image data 112 supplied to the evaluation index data generation unit 103 includes, for example, the first to the (T+1)th frame image data 132-1 to 132-(T+1) corresponding to the evaluation interval.

Figure 4:
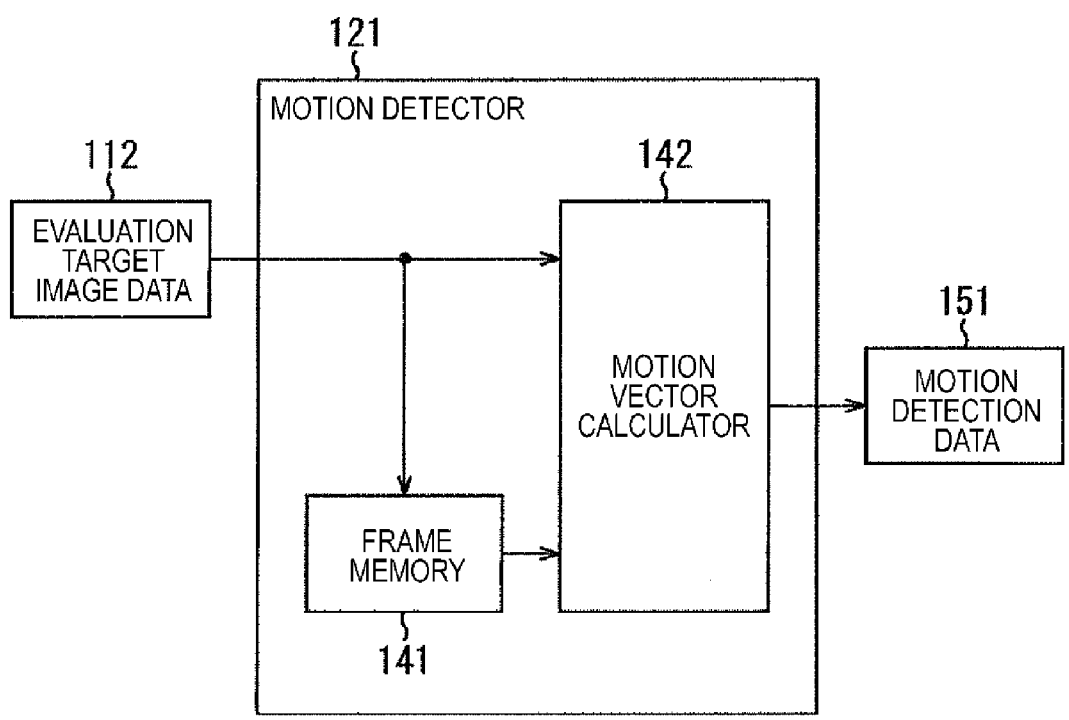
FIG. 4 is a block diagram showing a configuration example of a motion detector of FIG. 2.

FIG. 4 is a block diagram showing a main configuration example of the motion detector 121. As shown in FIG. 4, the motion detector 121 includes a frame memory 141 and a motion vector calculator 142. The frame memory 141 holds the frame image data 132 that is inputted for each frame period as the evaluation target image data 112.

The motion vector calculator 142 receives frame image data inputted as the evaluation target image data 112 of the current time and frame image data of the previous time that is held in the frame memory 141. Then, the motion vector calculator 142 calculates a motion vector indicating motion between the two frame image data for each block. The calculated motion vectors are supplied to the motion amount calculator 122 as motion detection data 151.

Figure 5:
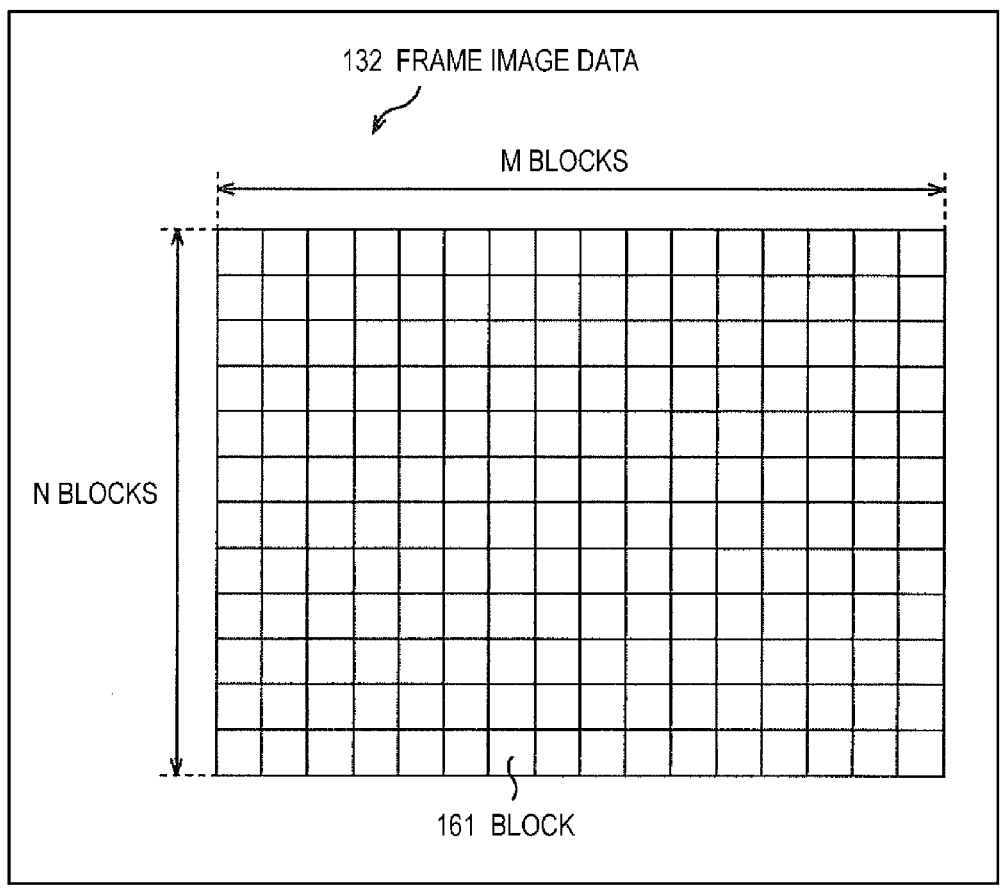
FIG. 5 is a diagram showing a configuration example of frame image data.

The process performed by the motion detector 121 of FIG. 4 will be described in more detail. The motion vector calculator 142 receives the frame image data 132 of the current time and the frame image data 132 of the previous time. The motion vector calculator 142 divides the received frame image data 132 into M*N blocks 161 (M and N are any natural numbers) as shown in FIG. 5, detects motion of each block 161 by, for example, a method such as block matching between the frame images, and generates motion vectors.

The motion vector calculator 142 performs this motion detection process by sequentially using the first to the (T+1)th frame image data 132. Specifically, the motion vector calculator 142 generates (M*N*T) motion detection data (motion vectors) by using (T+1) frame images. The motion vector calculator 142 supplies the motion vectors calculated as described above to the motion amount calculator 122 as the motion detection data.

Figure 6:
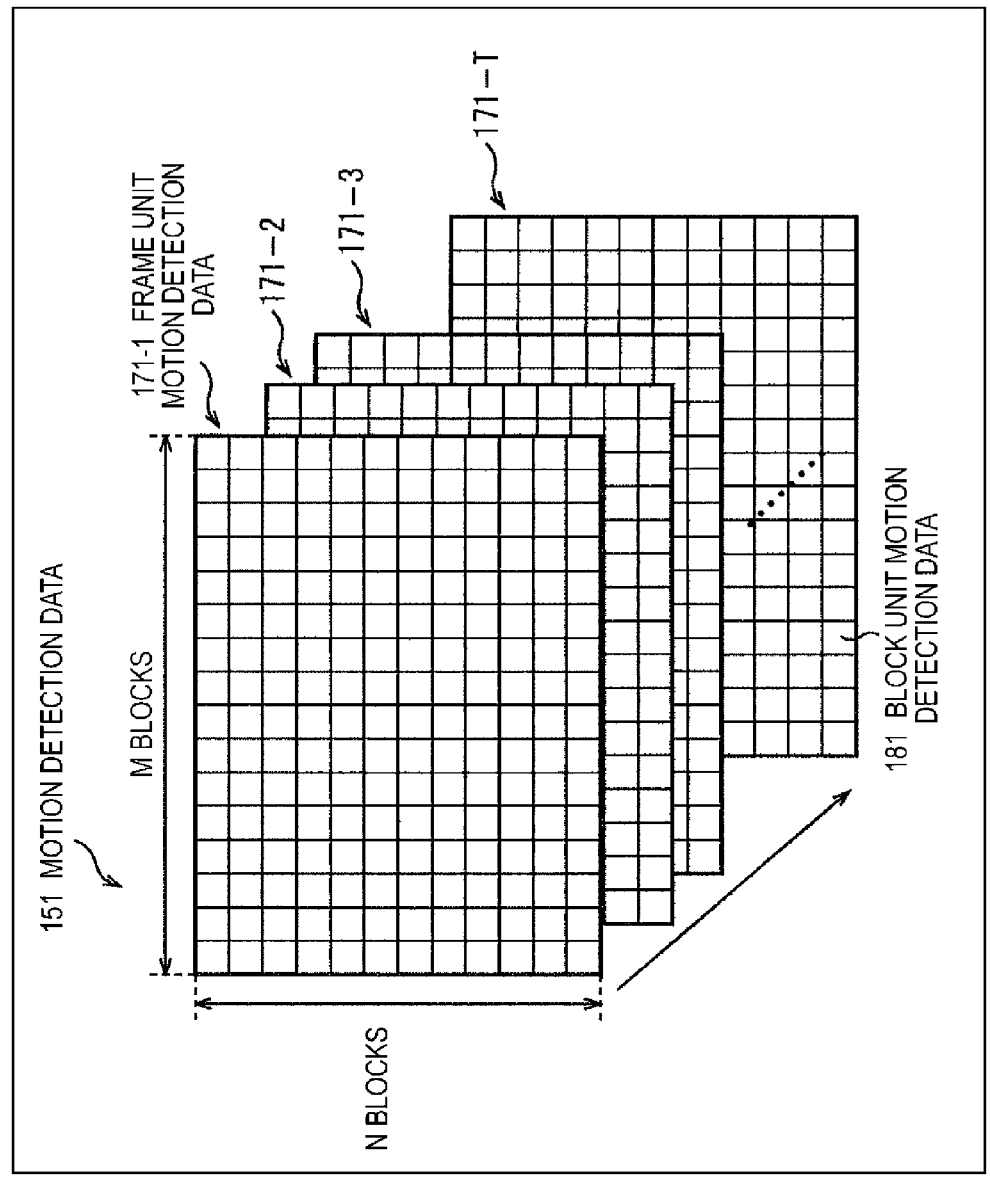
FIG. 6 is a diagram showing a configuration example of motion detection data.

When the last motion detection process that uses the T-th and (T+1)th frame image data 132 is completed, as shown in FIG. 6, the motion detection data including T frame unit motion detection data 171-1 to 171-T is supplied to the motion amount calculator 122.

Each of the frame unit motion detection data 171-1 to 171-T is obtained by performing the motion detection process on the frame image data 132 of the current time which is obtained for each frame period and the frame image data 132 of the previous time.

For example, the third frame unit motion detection data 171-3 is obtained by inputting the fourth frame image data 132-4 and the third frame image data 132-3 as the frame image data of the current time and the frame image data of the previous time, respectively, and performing the motion detection.

Each of the frame unit motion detection data 171-1 to 171-T is formed by (M*N) block unit motion detection data 181. Each of the block unit motion detection data 181 corresponds to one block 161 and is data indicating the motion vector detected for a corresponding block 161.

In this way, the motion detection data 151 of the present embodiment has a structure including (M*N) block unit motion detection data 181 for each frame unit motion detection data 171.

Figure 7:
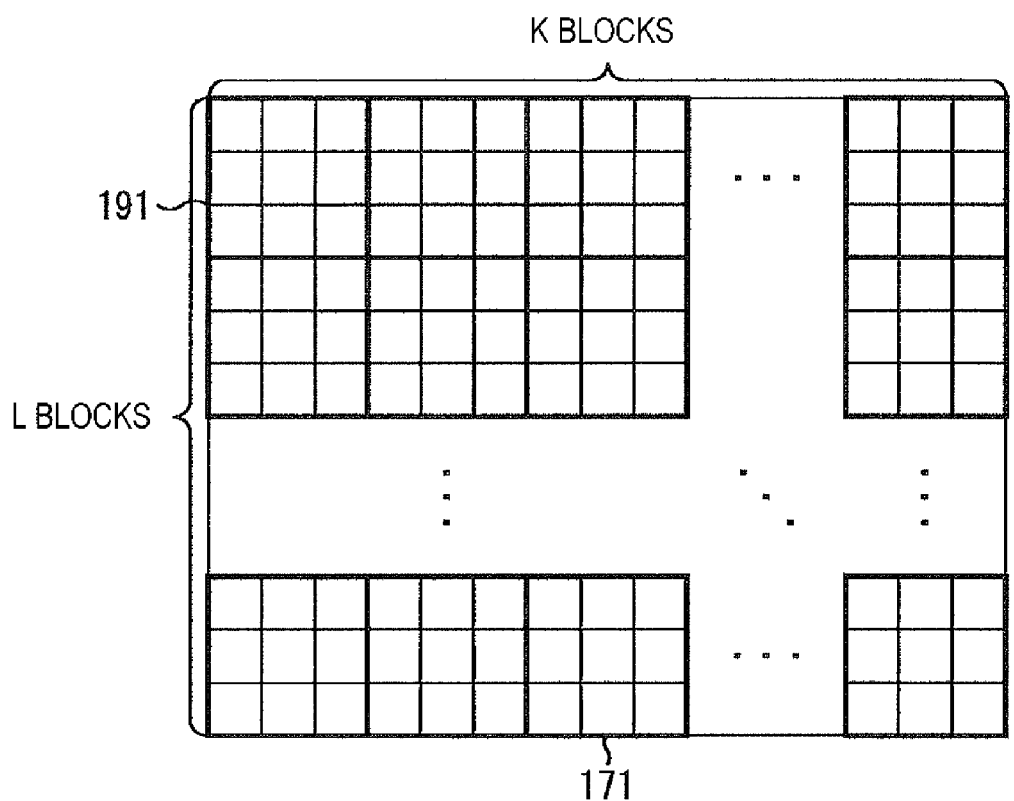
FIG. 7 is a diagram for explaining a process of a motion amount calculator.
Figure 8:
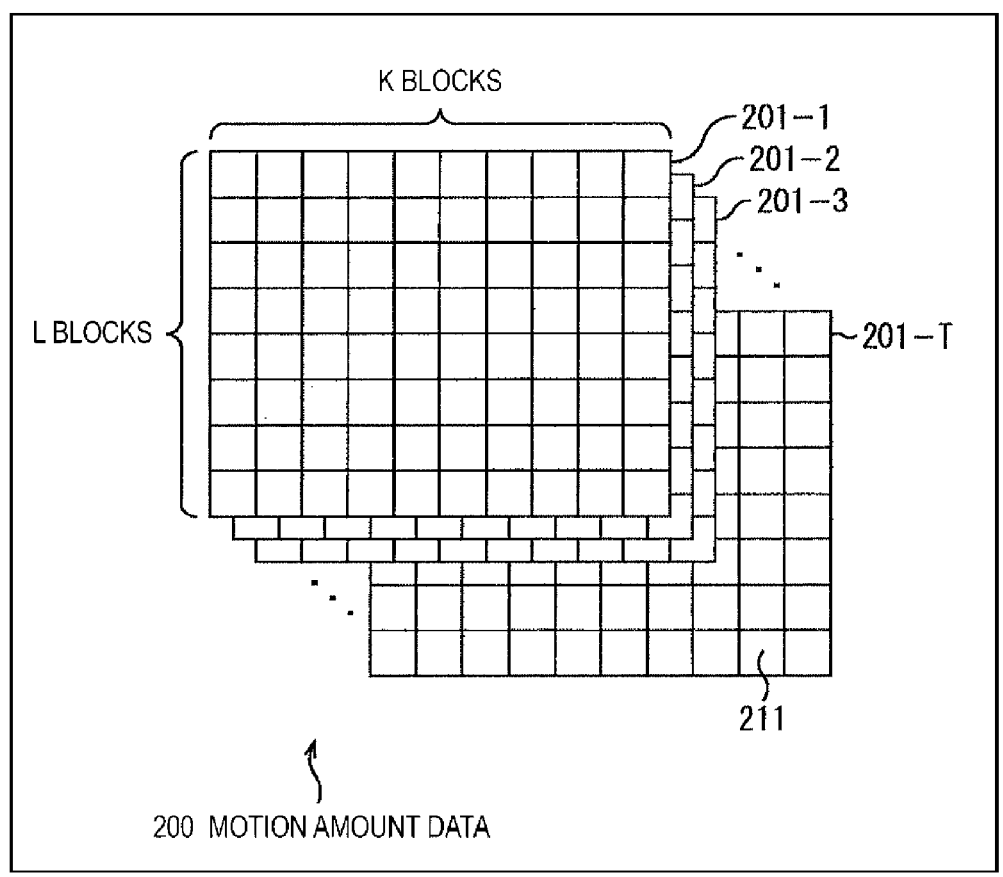
FIG. 8 is a diagram for explaining a process of the motion amount calculator.

FIGS. 7 and 8 are diagrams for explaining the process performed by the motion amount calculator 122.

Regarding the motion detection data 151, the motion amount calculator 122 newly divides each of the frame unit motion detection data 171 including (M*N) blocks into (K*L) blocks. For example, as shown in FIG. 7, the frame unit motion detection data 171 is divided into (K*L) blocks 191.

The motion amount calculator 122 calculates an average amount of motion in each block by calculating an average value of the block unit motion detection data 181 included in each of the (K*L) blocks 191. For example, when L=N/3 and K=M/3, an average value of 9 motion vectors (block unit motion detection data 181) in the block 191 is calculated, so that average amounts of motion of (K*L) blocks are calculated.

Thereby, as shown in FIG. 8, the motion amount data 200 including T frame unit motion amount data 201-1 to 201-T is generated. As described above, each of frame unit motion amount data 201-1 to 201-T is formed by (K*L) block unit motion amount data 211. Each of the block unit motion amount data 211 corresponds to one block 191 and is data indicating the average value of the motion vectors in a corresponding block 191.

Next, an example of the process of the propagation information calculator 123 will be described.

The propagation information calculator 123 calculates the propagation information, which is information related to the propagation of pulsation of the myocardial cells, as described below.

The propagation information calculator 123 generates waveform information 220 that represents a variation of the amount of motion based on the motion amount data 200. Specifically, the propagation information calculator 123 calculates a variation over time of each of the (K*L) block unit motion amount data 211 included in the motion amount data 200.

Figure 9:
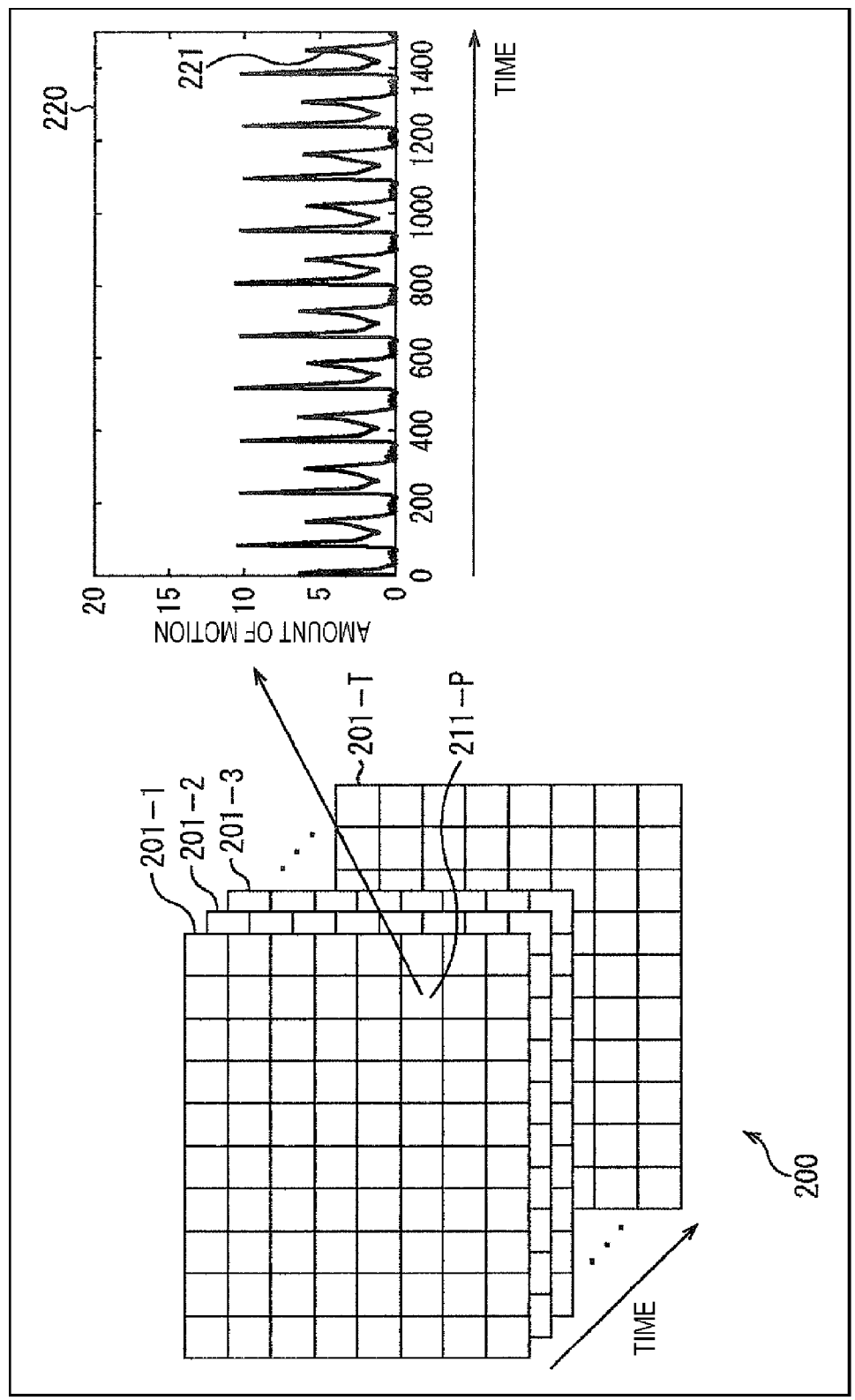
FIG. 9 is a diagram for explaining a process of a propagation information calculator.

For example, as shown in FIG. 9, the propagation information calculator 123 plots a value of the block unit motion amount data 211-p in the frame unit motion amount data 201-1 to 201-T included in the motion amount data 200 for each time. Thereby, the waveform information 220 of the block unit motion amount data 211-p is generated. In the waveform information 220 in FIG. 9, the horizontal axis represents time, the vertical axis represents the amount of motion, and the variation over time of the value of the block unit motion amount data 211-p is shown as a waveform 221.

Then, the propagation information calculator 123 identifies the rise time of each waveform in the waveform information 220. The waveform 221 in FIG. 9 is a waveform in which a high peak and a low peak alternately appear. Such a waveform is caused by repeated contraction and relaxation in the pulsation of the cultured myocardial cells. The high peak corresponds to the time when the cultured myocardial cells contract and the low peak corresponds to the time when the cultured myocardial cells relax.

Therefore, the time between the rise of the peak of contraction and the fall of the peak of relaxation shown by the waveform 221 can be recognized as one pulsation of the cultured myocardial cells of the block.

The peak corresponding to the contraction of the cultured myocardial cells and the peak corresponding to the relaxation of the cultured myocardial cells can be discriminated based on the following characteristics: In the waveform of the pulsation, the peak of contraction appears before the peak of relaxation. The speed of the peak of contraction is higher than that of relaxation. Further, the rise of the peak of contraction is steeper than that of relaxation. The speed of the starting point of the peak of contraction is lower than that of relaxation.

Figure 10:
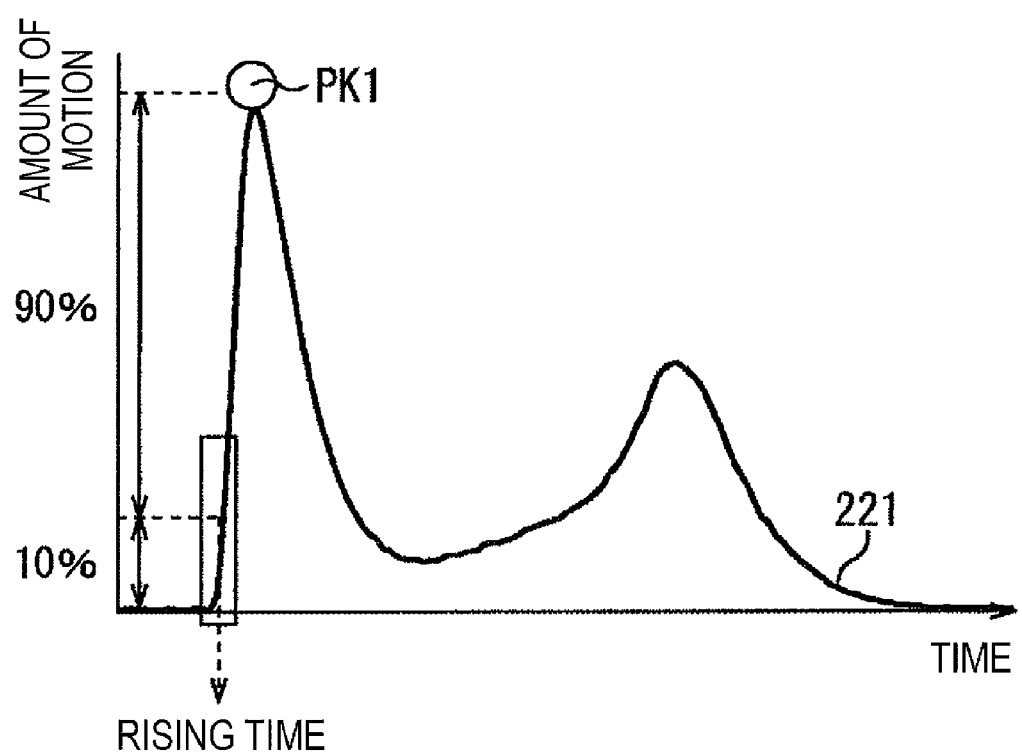
FIG. 10 is a diagram for explaining a process of the propagation information calculator.

FIG. 10 is a partially enlarged view of the waveform 221 of FIG. 9. At this time, the propagation information calculator 123 defines that the amount of motion of a high peak (that is, the peak corresponding to the contraction of the cultured myocardial cells) PK1 is 100% and identifies the time when the waveform rises to 10% of the amount of motion of the peak PK1 as a rise time $t_{up}$.

Figure 11:
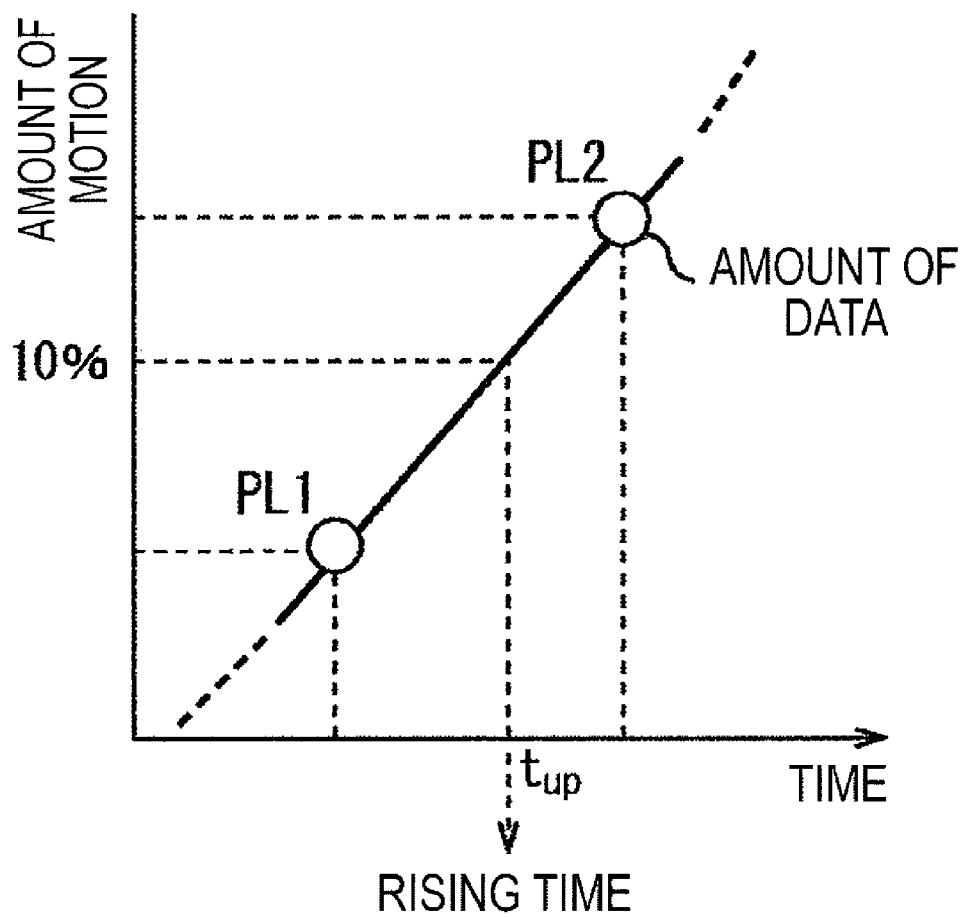
FIG. 11 is a diagram for explaining a process of the propagation information calculator.

If there is no plot point corresponding to the time when the waveform rises to 10% of the amount of motion of the peak PK1 in the waveform 221, the rise time $t_{up}$ is identified by interpolating the waveform based on plot points around the plot point corresponding to the time. FIG. 11 is an enlarged view of a portion around the rise of the waveform 221 in FIG. 10 (a portion surrounded by a rectangle in FIG. 10). In FIG. 11, the waveform is interpolated based on plot points PL1 and PL2.

In this way, the rise time of a block 191-*p* corresponding to the block unit motion amount data 211-*p* is identified. Further, the rise time of blocks around the block 191-*p* is identified.

Subsequently, the propagation information calculator 123 calculates a propagation speed and a propagation direction of the pulsation of the cultured myocardial cells.

Figure 12:
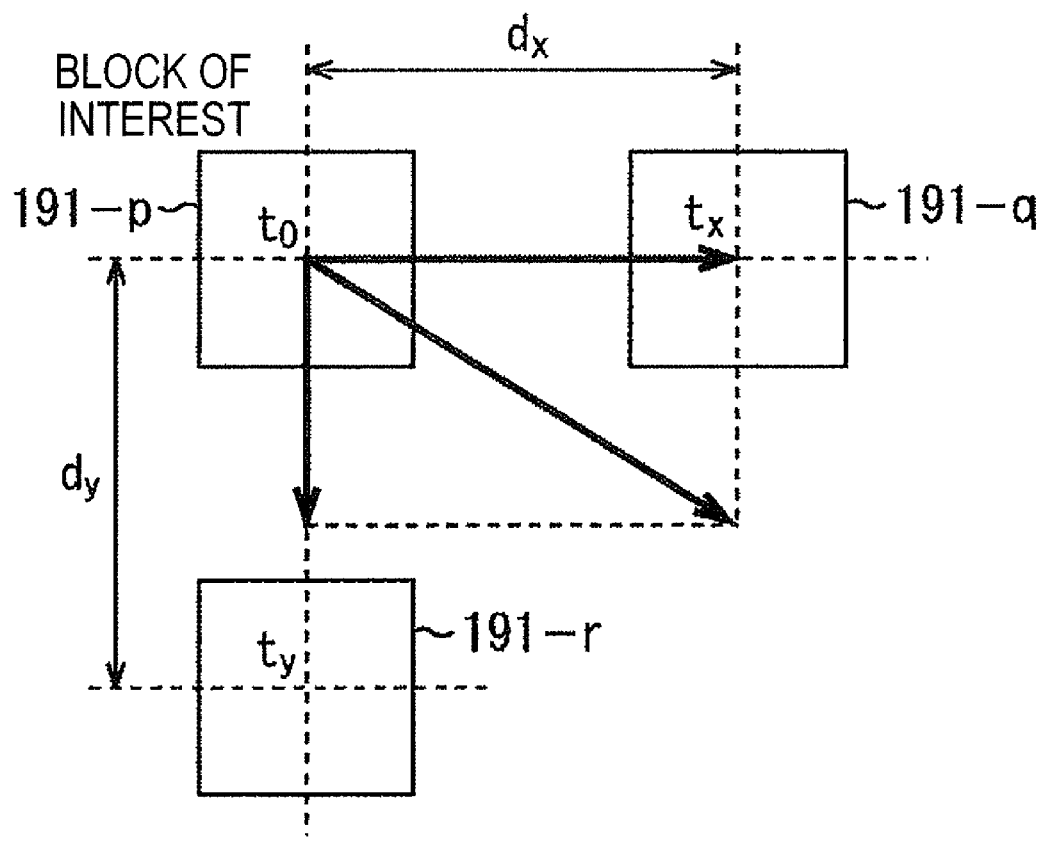
FIG. 12 is a diagram for explaining a process of the propagation information calculator.

As shown in FIG. 12, for example, the propagation information calculator 123 sets a block of interest in each of the (K*L) blocks 191. For example, the block 191-*p* is set as the block of interest and the rise time $t_0$ of the first pulsation of the block of interest 191-*p* is identified. Then, the rise time $t_x$ of the first pulsation of a block 191-*q* a predetermined distance away (for example, 2 blocks away) from the block of interest in the horizontal direction is identified and further the rise time $t_y$ of the first pulsation of a block 191-*r* a predetermined distance away (for example, 2 blocks away) from the block of interest in the vertical direction is identified.

The propagation information calculator 123 obtains a propagation speed $v_x$ of the pulsation in the horizontal direction and a propagation speed $v_y$ of the pulsation in the vertical direction by Formula (1).

[Math. 1]

$$v_x = \frac{d_x}{t_x - t_0}, \quad v_y = \frac{d_y}{t_y - t_0} \quad (1)$$

Further, the propagation information calculator 123 obtains a propagation speed |v| of the pulsation by Formula (2) based on the propagation speed $v_x$ of the pulsation in the horizontal direction and the propagation speed $v_y$ of the pulsation in the vertical direction.

[Math. 2]

$$|v| = \sqrt{v_x^2 + v_y^2} \quad (2)$$

Further, the propagation information calculator 123 obtains a propagation direction θ of the pulsation by Formula (3) based on the propagation speed $v_x$ of the pulsation in the horizontal direction and the propagation speed $v_y$ of the pulsation in the vertical direction.

[Math. 3]

$$\theta = \tan^{-1}\frac{v_y}{v_x} \quad (3)$$

In this way, the propagation speed and the propagation direction of the block 191-*p* are calculated. In the same manner, the propagation speed and the propagation direction of other blocks are calculated by handling the other blocks as the block of interest.

In this way, the propagation speed and the propagation direction of the pulsation of the cultured myocardial cells are calculated. The propagation speed and the propagation direction obtained here are obtained for each pulsation for each block of the motion amount data 200. For example, the propagation speed and the propagation direction are obtained for each pulsation for each block in a manner such as the propagation speed and the propagation direction of the first pulsation, the propagation speed and the propagation direction of the second pulsation, and the propagation speed and the propagation direction of the third pulsation, and the like in a block 191-*p* and the propagation speed and the propagation direction of the first pulsation, the propagation speed and the propagation direction of the second pulsation, and the propagation speed and the propagation direction of the third pulsation, and the like in a block 191-*p*+1.

The propagation speed and the propagation direction for each pulsation for each block of the motion amount data 200, which are obtained in this way, are outputted as the evaluation index data 113.

Back to FIG. 1, an example of the process of the evaluation unit 104 will be described.

The evaluation unit 104 obtains an average value $Av_x$ of the propagation speed of the pulsation in the horizontal direction and an average value $Av_y$ of the propagation speed of the pulsation in the vertical direction of each block of the motion amount data 200 by Formula (4).

[Math. 4]

$$Av_x = \frac{\sum_{K-2}\sum_{L-2} v_x}{(K-2)(L-2)}, \quad Av_y = \frac{\sum_{K-2}\sum_{L-2} v_y}{(K-2)(L-2)} \quad (4)$$

Further, the evaluation unit 104 obtains an average value Aθ of the propagation direction of the pulsation by Formula (5) based on the average value $Av_x$ of the propagation speed of the pulsation in the horizontal direction and the average value $Av_y$ of the propagation speed of the pulsation in the vertical direction.

[Math. 5]

$$A\theta = \tan^{-1}\frac{Av_y}{Av_x} \quad (5)$$

Figure 13:
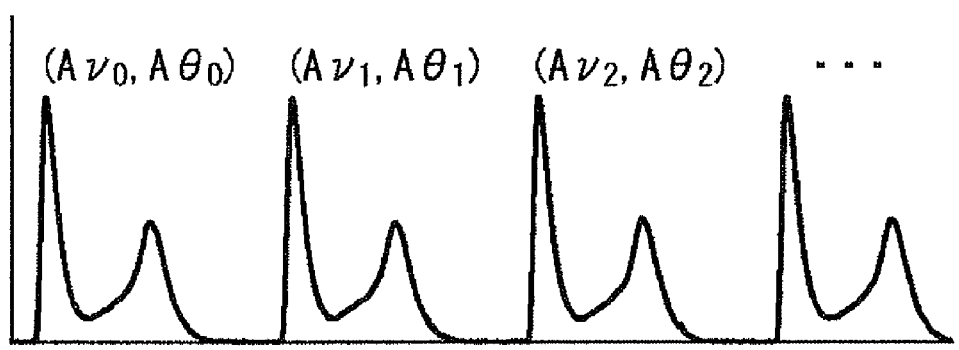
FIG. 13 is a diagram for explaining a process of an evaluation unit.

Accordingly, the average value of the propagation speed and the average value of the propagation direction of the entire motion amount data 200 (that is, the entire image of the cultured myocardial cells 110 obtained by picking up the image) can be obtained for each pulsation. For example as shown in FIG. 13, the waveform of the pulsation and information in which the average value of the propagation speed and the average value of the propagation direction are associated with each other are obtained. In the example of FIG. 13, it is defined that the average value of the propagation speed and the average value of the propagation direction of the first pulsation is ($Av_0$, $A\theta_0$), the average value of the propagation speed and the average value of the propagation direction of the second pulsation is ($Av_1$, $A\theta_1$), the average value of the propagation speed and the average value of the propagation direction of the third pulsation is ($Av_2$, $A\theta_2$), and the like.

Further, the evaluation unit 104 calculates a distribution value of the average value of the propagation speed of a plurality of pulsations and a distribution value of the average value of the propagation direction of a plurality of pulsations. Further, the evaluation unit 104 calculates a maximum value and a minimum value of the average value of the propagation speed of a plurality of pulsations and a maximum value and a minimum value of the average value of the propagation direction of a plurality of pulsations. Further, the evaluation unit 104 detects whether or not the average value of the propagation speed of a plurality of pulsations is within a certain range.

Then, the evaluation unit 104 calculates an evaluation value $E_1$ and an evaluation value $E_2$ which represent the smallness (the degree of distribution) of the distribution value of the average value of the propagation speed of a plurality of pulsations and the smallness (the degree of distribution) of the distribution value of the average value of the propagation direction of a plurality of pulsations. Further, the evaluation unit 104 calculates an evaluation value $E_3$ representing the smallness of a difference absolute value between the maximum value and the minimum value of the average value of the propagation speed of a plurality of pulsations and an evaluation value $E_4$ representing the smallness of a difference absolute value between the maximum value and the minimum value of the average value of the propagation direction of a plurality of pulsations.

Figure 14:
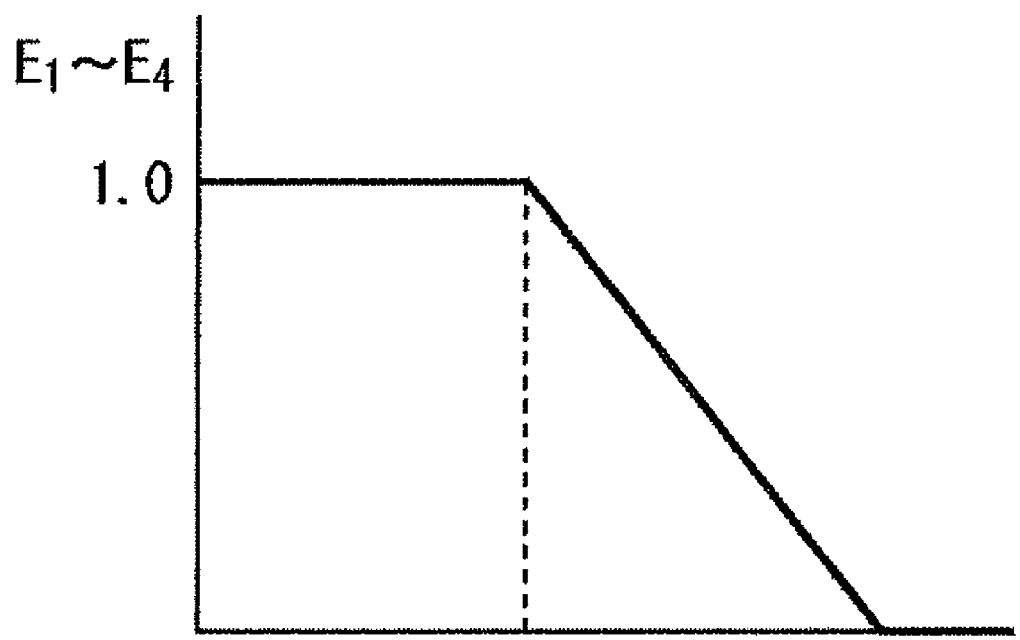
FIG. 14 is a diagram for explaining a process of the evaluation unit.

For example, the evaluation values $E_1$ to $E_4$ are obtained as shown in FIG. 14. In FIG. 14, the horizontal axis represents the distribution value of the average value of the propagation speed and the distribution value of the average value of the propagation direction or the difference absolute value between the maximum value and the minimum value of the average value of the propagation speed and the difference absolute value between the maximum value and the minimum value of the average value of the propagation direction, and the vertical axis represents the evaluation values. As shown in FIG. 14, when the value of the horizontal axis is smaller than a predetermined threshold value, the evaluation values are 1, and when the value of the horizontal axis is greater than or equal to the predetermined threshold value, the evaluation values decrease.

Further, the evaluation unit 104 calculates an evaluation value $E_5$ that represents a degree at which the average value of the propagation speed of a plurality of pulsations is within a certain range.

Figure 15:
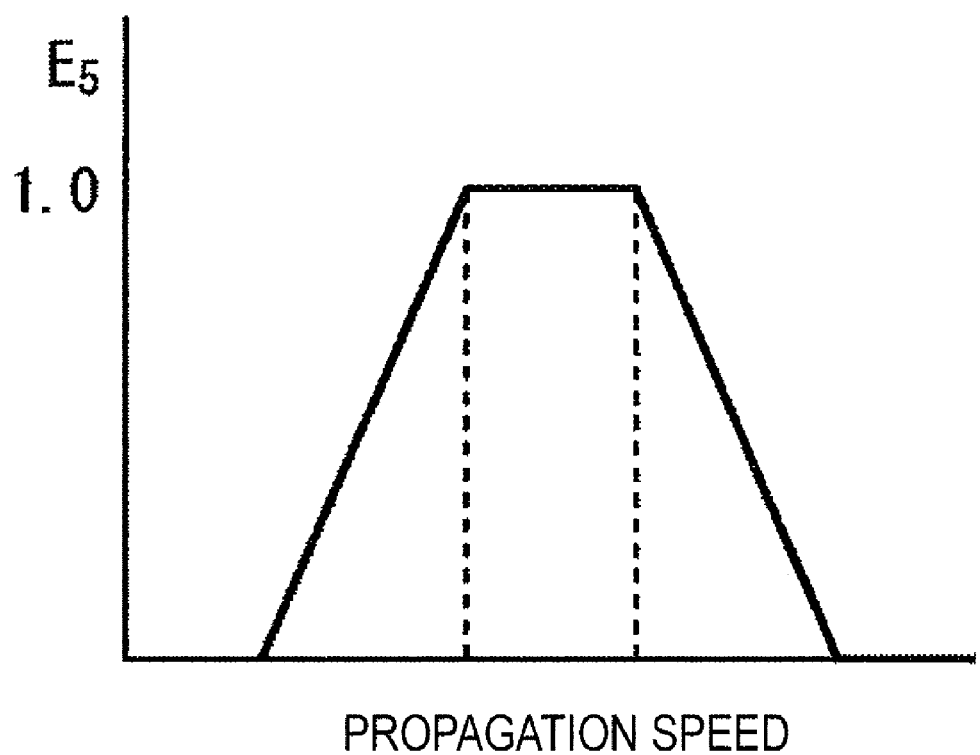
FIG. 15 is a diagram for explaining a process of the evaluation unit.

For example, the evaluation value $E_5$ is obtained as shown in FIG. 15. In FIG. 15, the horizontal axis represents the average value of the propagation speed and the vertical axis represents the evaluation value. As shown in FIG. 15, when the average value of the propagation speed is within a certain range, the evaluation value is 1, and when the propagation speed is out of the certain range, the evaluation value decreases.

The evaluation unit 104 obtains an evaluation value E that represents stability of the pulsation of the cultured myocardial cells by Formula (6) using the evaluation values $E_1$ to $E_5$ calculated as described above.

[Math.6]

$$E=\alpha_1E_1+\alpha_2E_2+\alpha_3E_3+\alpha_4E_4+\alpha_5E_5 \quad (6)$$

Here, $\alpha_1$ to $\alpha_5$ in Formula (6) are predetermined weight coefficients.

The evaluation value E calculated in this way is an evaluation value representing the stability of the pulsation of the cultured myocardial cells corresponding to a predetermined number of pulsations. For example, the evaluation value 114 is formed from a plurality of temporally continuous evaluation values E and the evaluation value 114 is outputted from the evaluation unit 104.

Back to FIG. 1, an example of the process of the display unit 105 will be described.

The display unit 105 performs a process to visualize and display information related to the evaluation index data 113 or the evaluation value 114.

For example, the display unit 105 displays the propagation of the pulsation as isochrones. For example, as described with reference to FIGS. 10 and 11, the rise time of each block 191 is acquired. The display unit 105 displays the propagation of the pulsation as isochrones by defining that the blocks 191 where the difference of the rise time is within a predetermined range are isochrone blocks and displaying each set of the isochrone blocks in the same color.

Figure 16:
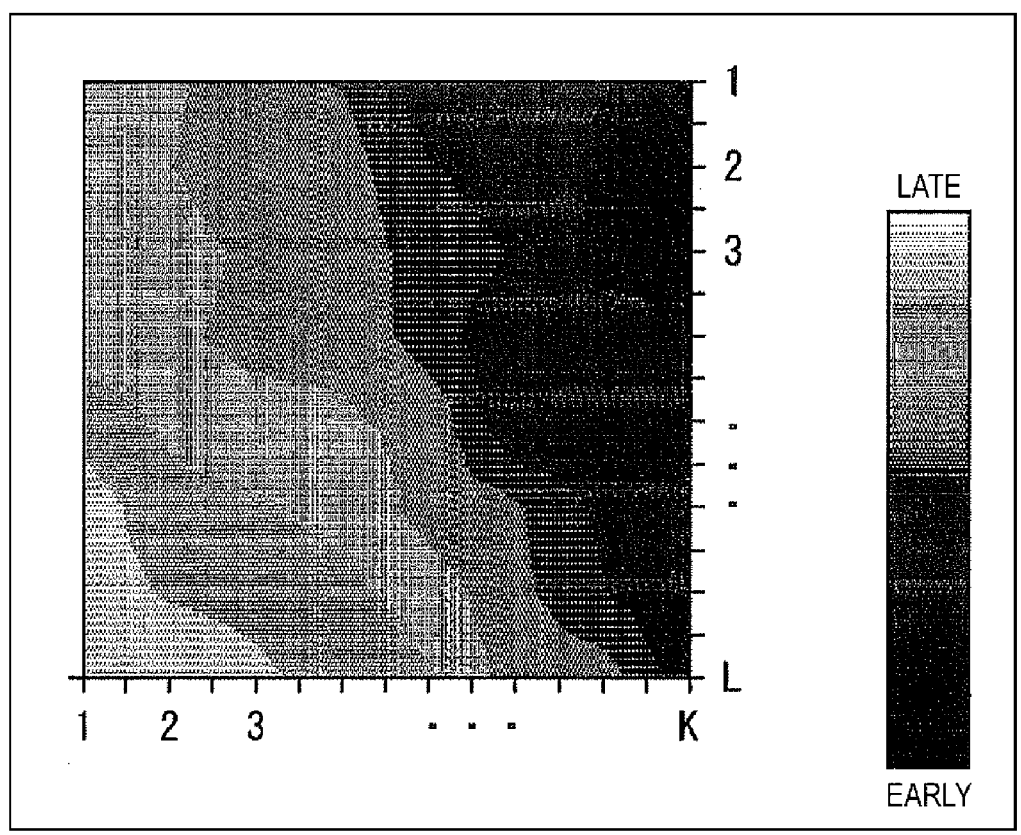
FIG. 16 is a diagram showing an example of information displayed by a display unit.

FIG. 16 is a diagram showing an example of a display of isochrones of the propagation of the pulsation. In this example, the blocks 191 where the rise time is early are displayed in a dark color. As the rise time is later, the color of the displayed blocks 191 is lighter.

When the isochrones are displayed as shown in FIG. 16, it is possible to easily know how the pulsation propagates in the cultured myocardial cells. Further, such a display of isochrones can be obtained for each pulsation, so that it is possible to evaluate the stability of the pulsation in further detail.

For example, the display unit 105 displays a histogram of the propagation direction of the pulsation. As described above, the propagation direction of the pulsation for each block 191 is calculated by Formula (3). For example, the number of blocks 191 where the propagation direction of the pulsation is the same is defined as a frequency and a histogram is displayed based on the propagation direction and the frequency.

Figure 17:
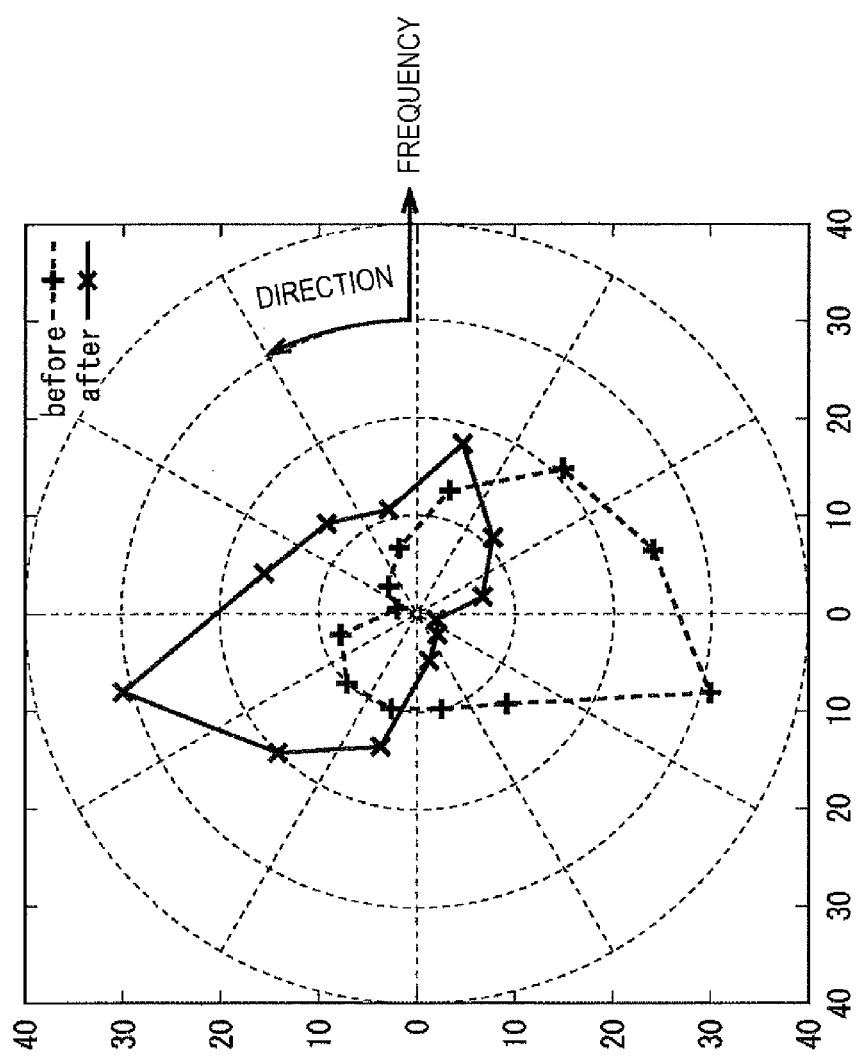
FIG. 17 is a diagram showing an example of information displayed by the display unit.

FIG. 17 is a diagram showing an example of the histogram display of the propagation direction of the pulsation. In this example, the propagation direction of the pulsation is shown with the central point in the drawing as a reference. The histogram is displayed so that the farther away from the center of the drawing, the higher the frequency is. In the example of FIG. 17, a histogram of the propagation direction of the pulsation before the drug is administered is shown by a dashed line and a histogram of the propagation direction of the pulsation after the drug is administered is shown by a solid line.

As shown in FIG. 17, by displaying the histograms, it is possible to easily know the change of the propagation direction of the pulsation before and after the drug administration. Further, such histograms can be obtained for each pulsation, so that it is possible to evaluate the stability of the pulsation in further detail.

For example, the display unit 105 displays the propagation speed and the propagation direction for each pulsation. As described above with reference to FIG. 13, it is possible to obtain the waveform of the pulsation and information in which the average value of the propagation speed and the average value of the propagation direction are associated with each other. For example, the average value of the propagation speed and the average value of the propagation direction are visualized and displayed by an arrow or the like along with the waveform of the pulsation.

Figure 18:
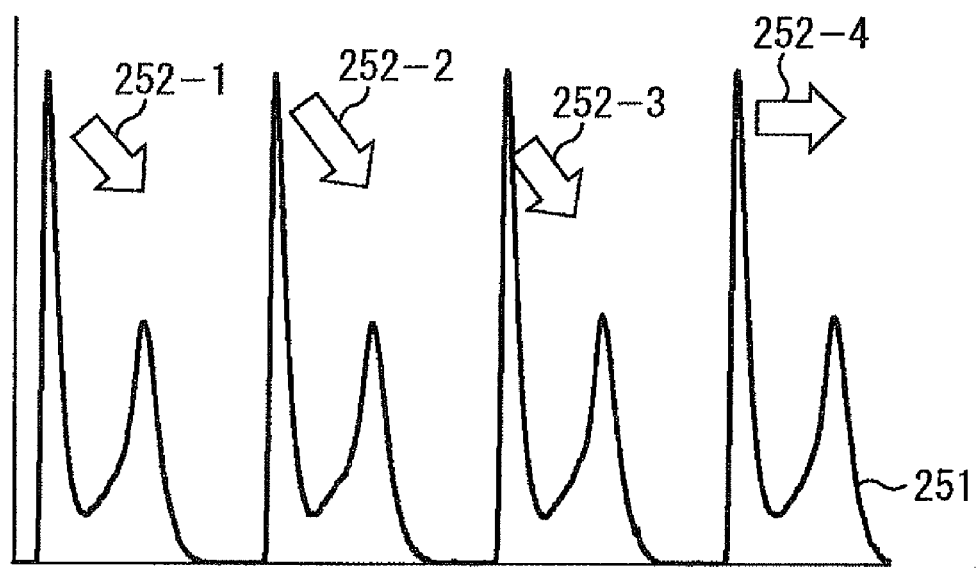
FIG. 18 is a diagram showing an example of information displayed by the display unit.

FIG. 18 is a diagram showing an example of displaying the propagation speed and the propagation direction for each pulsation. In FIG. 18, the waveform of the pulsation is shown by a line 251. Further, the propagation speed and the propagation direction for each pulsation are shown by arrows 252-1 to 252-4 along with the waveform of the pulsation. In this way, the propagation speed and the propagation direction are displayed by the length and the direction of the arrows in association with each pulsation, so that it is possible to evaluate the stability of the pulsation in further detail.

Further, for example, the display unit 105 may visualize and display the transition of the evaluation value 114 over time.

Figure 19:
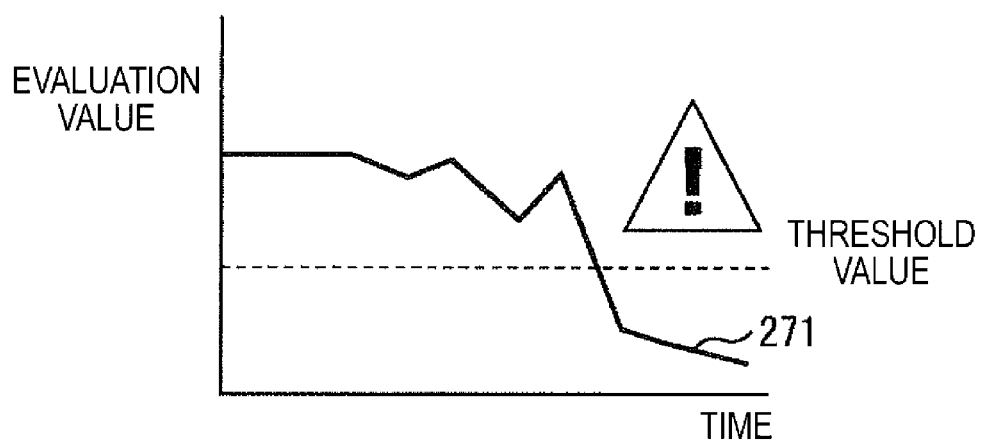
FIG. 19 is a diagram showing an example of information displayed by the display unit.

FIG. 19 is a diagram showing an example of visualizing and displaying the transition of the evaluation value 114 over time. In FIG. 19, the horizontal axis represents time, the vertical axis represents the magnitude of the evaluation value E, and the transition of the evaluation value 114 over time is displayed by a line 271.

In the example of FIG. 19, when the line 271 falls below a threshold value, a warning is displayed.

In this way, the display unit 105 visualizes and displays the information related to the evaluation index data 113 or the evaluation value 114. For example, the display unit 105 displays the information shown in FIGS. 16 to 19 by displaying the information on a display or printing the information through a printer. All the information shown in FIGS. 16 to 19 need not necessarily be displayed. For example, the information may be displayed based on a selection of a user.

Next, an example of a pulsation evaluation process of the drug evaluation device 100 to which the present technology is applied will be described with reference to the flowchart of FIG. 20.

In step S21, the evaluation target image data generation recording unit 102 acquires image data in which the image of the cultured myocardial cells is picked up.

Figure 21:
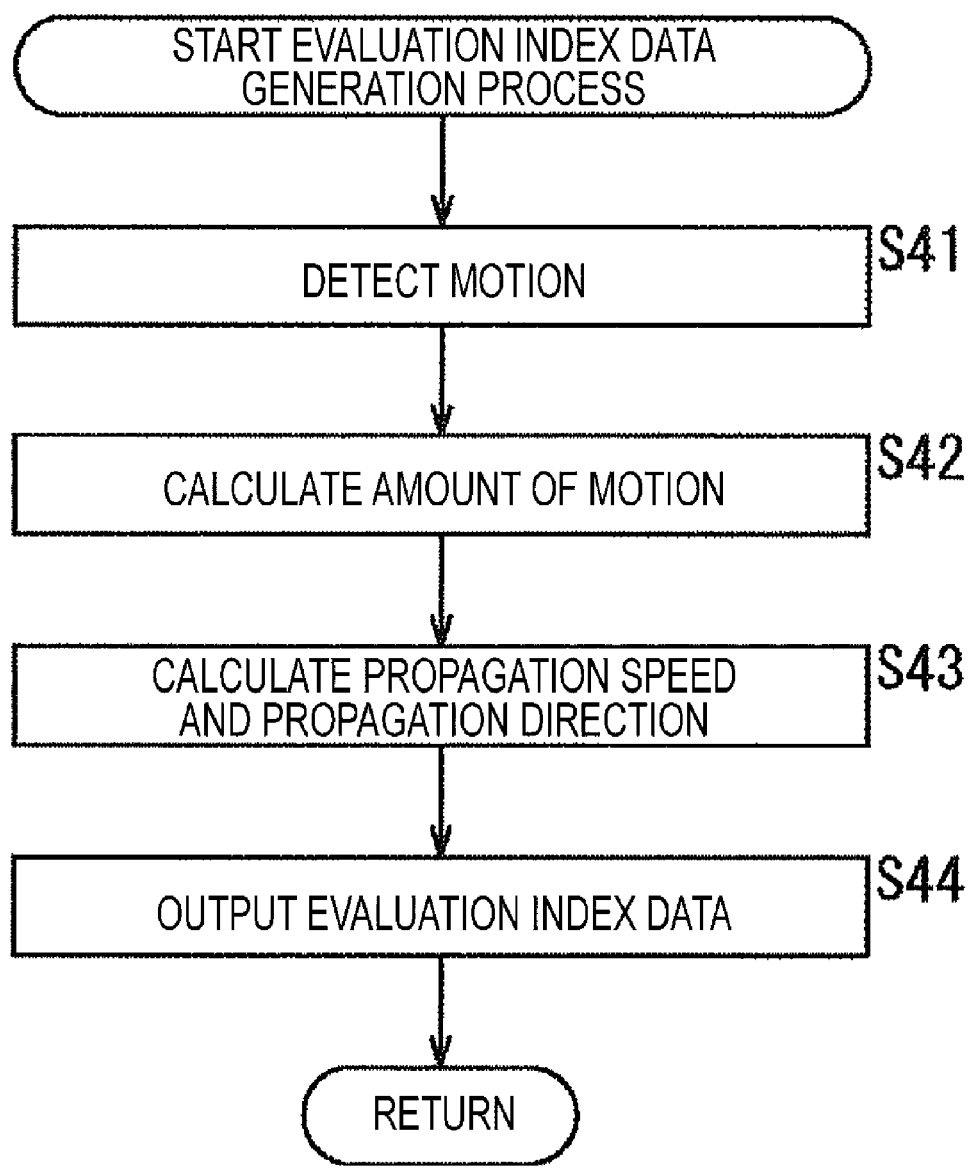
FIG. 21 is a flowchart for explaining an example of an evaluation index data generation process.

In step S22, the evaluation index data generation unit 103 performs an evaluation index data generation process that will be described later with reference to the flowchart of FIG. 21. Thereby, the evaluation index data is generated.

Figure 22:
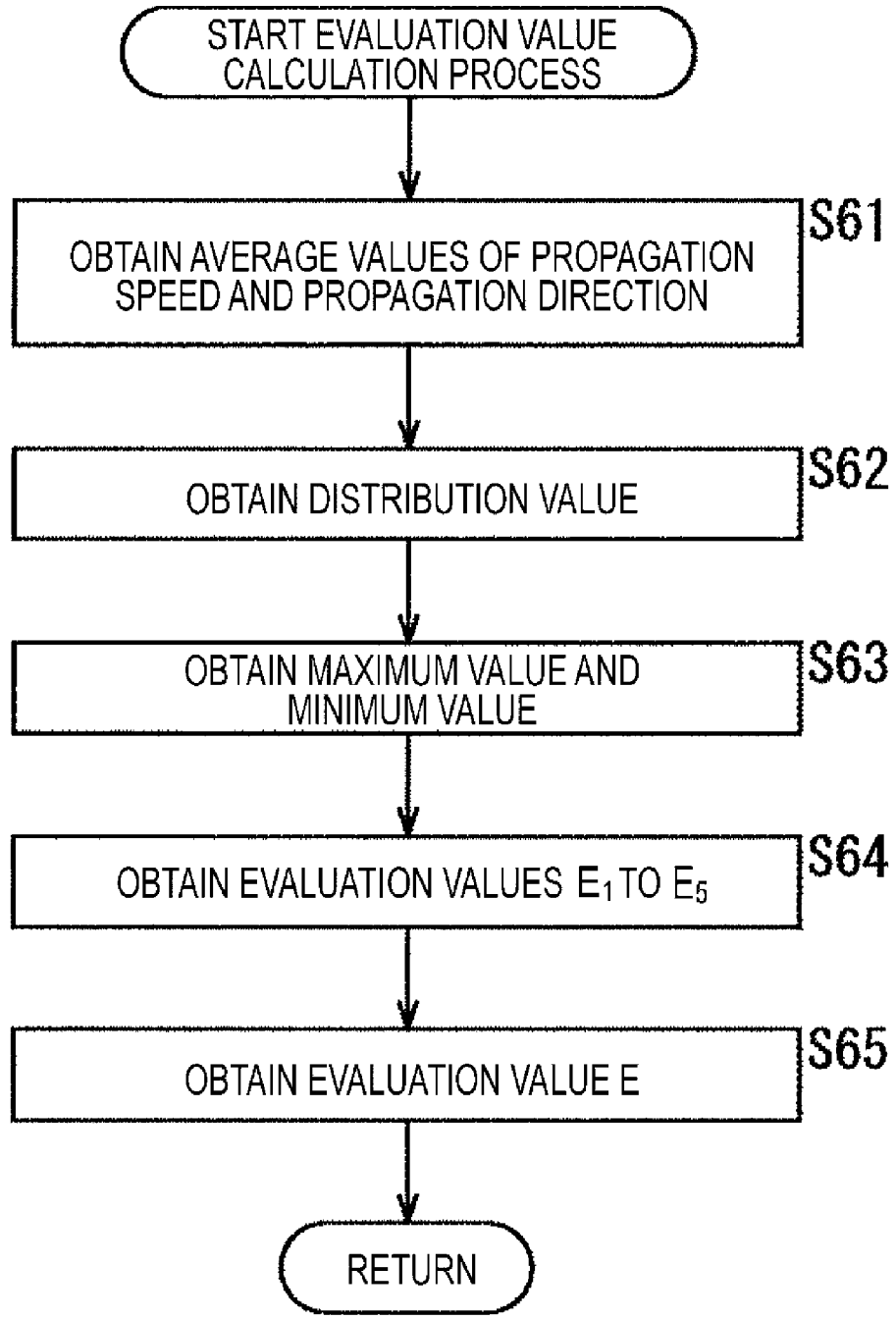
FIG. 22 is a flowchart for explaining an example of an evaluation value calculation process.

In step S23, the evaluation unit 104 performs an evaluation value calculation process that will be described later with reference to the flowchart of FIG. 22. Thereby, the evaluation value is generated.

Figure 23:
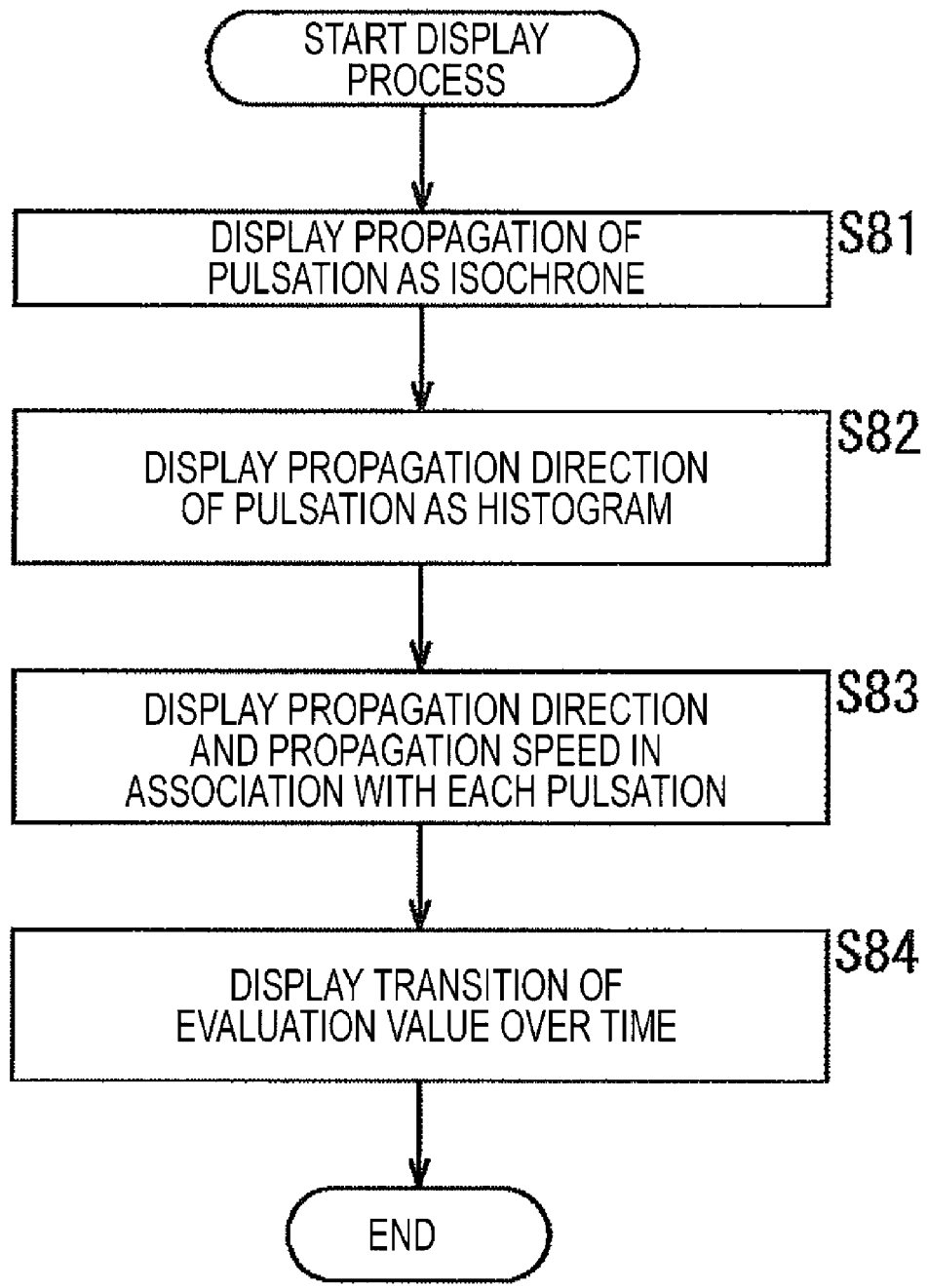
FIG. 23 is a flowchart for explaining an example of a display process.

In step S24, the display unit 105 performs a display process that will be described later with reference to the flowchart of FIG. 23. Thereby, the information related to the evaluation index data 113 or the evaluation value 114 is visualized and displayed.

In this way, the pulsation evaluation process is performed.

Next, a detailed example of the evaluation index data generation process in step S22 of FIG. 20 will be described with reference to the flowchart of FIG. 21.

Figure 20:
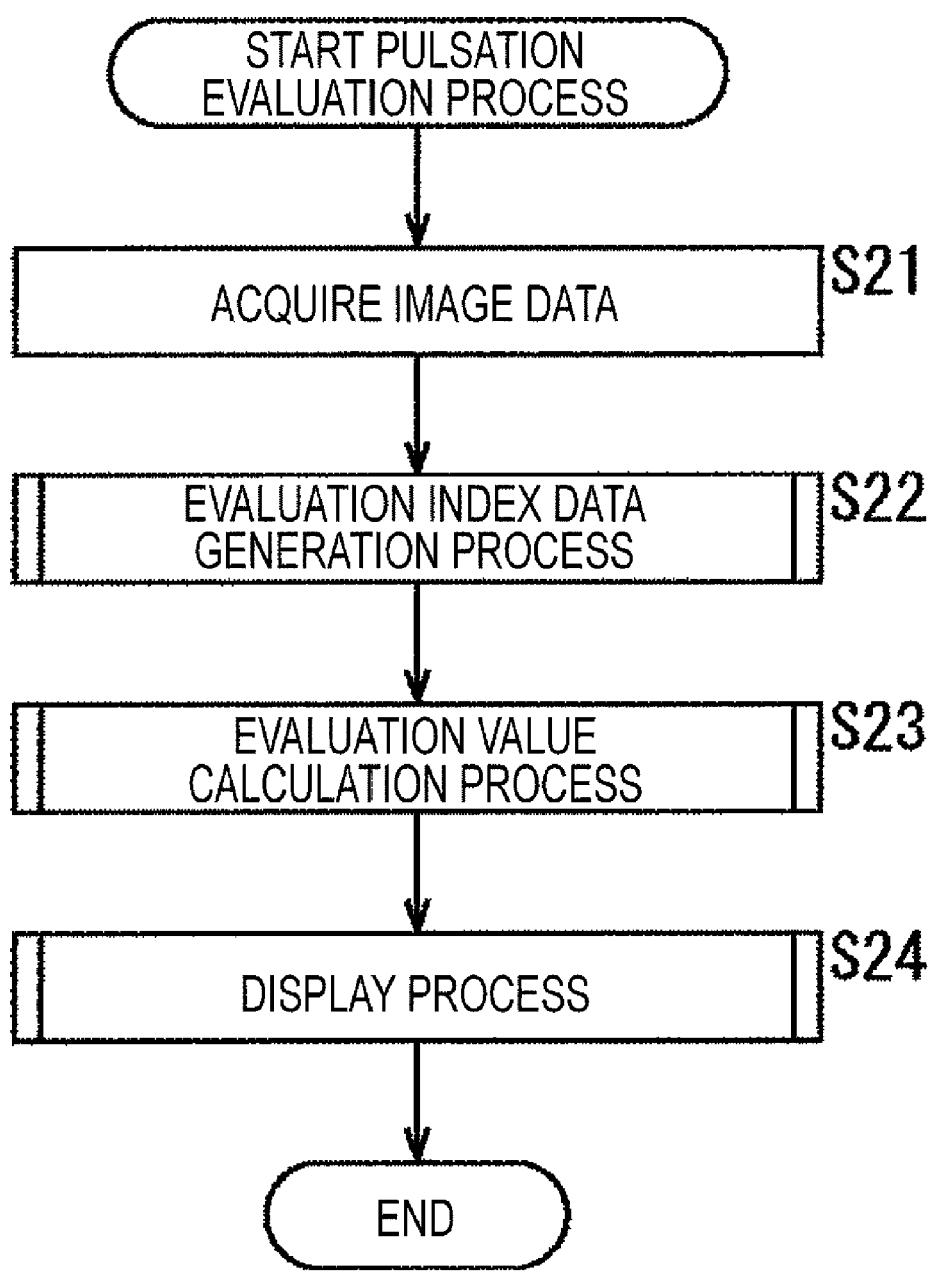
FIG. 20 is a flowchart for explaining an example of a pulsation evaluation process.

In step S41, the motion detector 121 performs the motion detection based on the image data acquired in step S21 of FIG. 20. Thereby, as described above, the motion detection data 151 including (M*N) block unit motion detection data 181 is obtained.

In step S42, the motion amount calculator 122 calculates the amount of motion based on the motion detection data 151 obtained in the process of step S41. At this time, for example, in the motion detection data 151, each of the frame unit motion detection data 171 including (M*N) blocks is newly divided into (K*L) blocks, so that the frame unit motion detection data 171 is divided into (K*L) blocks 191. Then, an average amount of motion in each block is calculated by calculating an average value of the block unit motion detection data 181 included in each of the (K*L) blocks 191.

Thereby, as shown in FIG. 8, the motion amount data 200 including T frame unit motion amount data 201-1 to 201-T is generated.

In step S43, the propagation information calculator 123 calculates the propagation speed and the propagation direction of the pulsation. At this time, as described above, the waveform information 220 that represents the variation of the amount of motion based on the motion amount data 200 and the rise time of each waveform in the waveform information 220 is identified. Then, each of the propagation speed $v_x$ of the pulsation in the horizontal direction and the propagation speed $v_y$ of the pulsation in the vertical direction is obtained by Formula (1) and the propagation speed $|v|$ of the pulsation is obtained by Formula (2). Further, the propagation direction $\theta$ of the pulsation is obtained by Formula (3).

In step S44, the evaluation index data is outputted. Specifically, the propagation speed and the propagation direction for each pulsation for each block of the motion amount data 200, which are obtained as described above, are outputted as the evaluation index data 113.

Next, a detailed example of the evaluation value calculation process in step S23 of FIG. 20 will be described with reference to the flowchart of FIG. 22.

In step S61, the evaluation unit 104 obtains the average value $Av_x$ of the propagation speed of the pulsation in the horizontal direction and the average value $Av_y$ of the propagation speed of the pulsation in the vertical direction of each block of the motion amount data 200 by Formula (4). In step S61, the evaluation unit 104 obtains the average value $A\theta$ of the propagation direction of the pulsation by Formula (5) based on the average value $Av_x$ of the propagation speed of the pulsation in the horizontal direction and the average value $Av_y$ of the propagation speed of the pulsation in the vertical direction.

In step S62, the evaluation unit 104 calculates the distribution value of the average value of the propagation speed of a plurality of pulsations and the distribution value of the average value of the propagation direction of a plurality of pulsations.

In step S63, the evaluation unit 104 calculates the maximum value and the minimum value of the average value of the propagation speed of a plurality of pulsations and the maximum value and the minimum value of the average value of the propagation direction of a plurality of pulsations. Further, the evaluation unit 104 detects whether or not the average value of the propagation speed of a plurality of pulsations is within a certain range.

In step S64, the evaluation unit 104 calculates the evaluation value $E_1$ and the evaluation value $E_2$ which represent the smallness of the distribution value of the average value of the propagation speed of a plurality of pulsations and the distribution value of the average value of the propagation direction of a plurality of pulsations. Further, the evaluation unit 104 calculates the evaluation value $E_3$ representing the smallness of the difference absolute value between the maximum value and the minimum value of the average value of the propagation speed of a plurality of pulsations and the evaluation value $E_4$ representing the smallness of the difference absolute value between the maximum value and the minimum value of the average value of the propagation direction of a plurality of pulsations. Further, the evaluation unit 104 calculates an evaluation value $E_5$ that represents a degree at which the average value of the propagation speed of a plurality of pulsations is within a certain range.

In step S65, the evaluation unit 104 obtains the evaluation value E that represents stability of the pulsation of the cultured myocardial cells by Formula (6) using the evaluation values $E_1$ to $E_5$ calculated as described above.

The evaluation value E calculated in this way is an evaluation value representing the stability of the pulsation of the cultured myocardial cells corresponding to a predetermined number of pulsations. For example, the evaluation value 114 is formed from a plurality of temporally continuous evaluation values E and the evaluation value 114 is outputted from the evaluation unit 104.

Next, a detailed example of the display process in step S24 of FIG. 20 will be described with reference to the flowchart of FIG. 23.

In step S81, the display unit 105 displays the propagation of the pulsation as isochrones. Thereby, for example, as shown in FIG. 16, the propagation of the pulsation is displayed as isochrones.

In step S82, the display unit 105 displays the propagation direction of the pulsation as a histogram. Thereby, for example, as shown in FIG. 17, the propagation direction of the pulsation is displayed as a histogram.

In step S83, the display unit 105 displays the propagation speed and the propagation direction for each pulsation. Thereby, for example, as shown in FIG. 18, the propagation speed and the propagation direction are displayed for each pulsation.

In step S84, the display unit 105 displays the transition of the evaluation value 114 over time. Thereby, for example, as shown in FIG. 19, the transition of the evaluation value 114 over time is displayed.

In the display process, each of steps S81 to S84 need not necessarily be performed and, for example, each of steps S81 to S84 may be selectively performed.

The series of processes described above can be performed by hardware or can be performed by software. When the series of processes described above are performed by software, programs included in the software are installed on a computer embedded in dedicated hardware or, for example, a general-purpose personal computer 700 as shown in FIG. 24, which can perform various functions by installing various programs, from a network or a recording medium.

Figure 24:
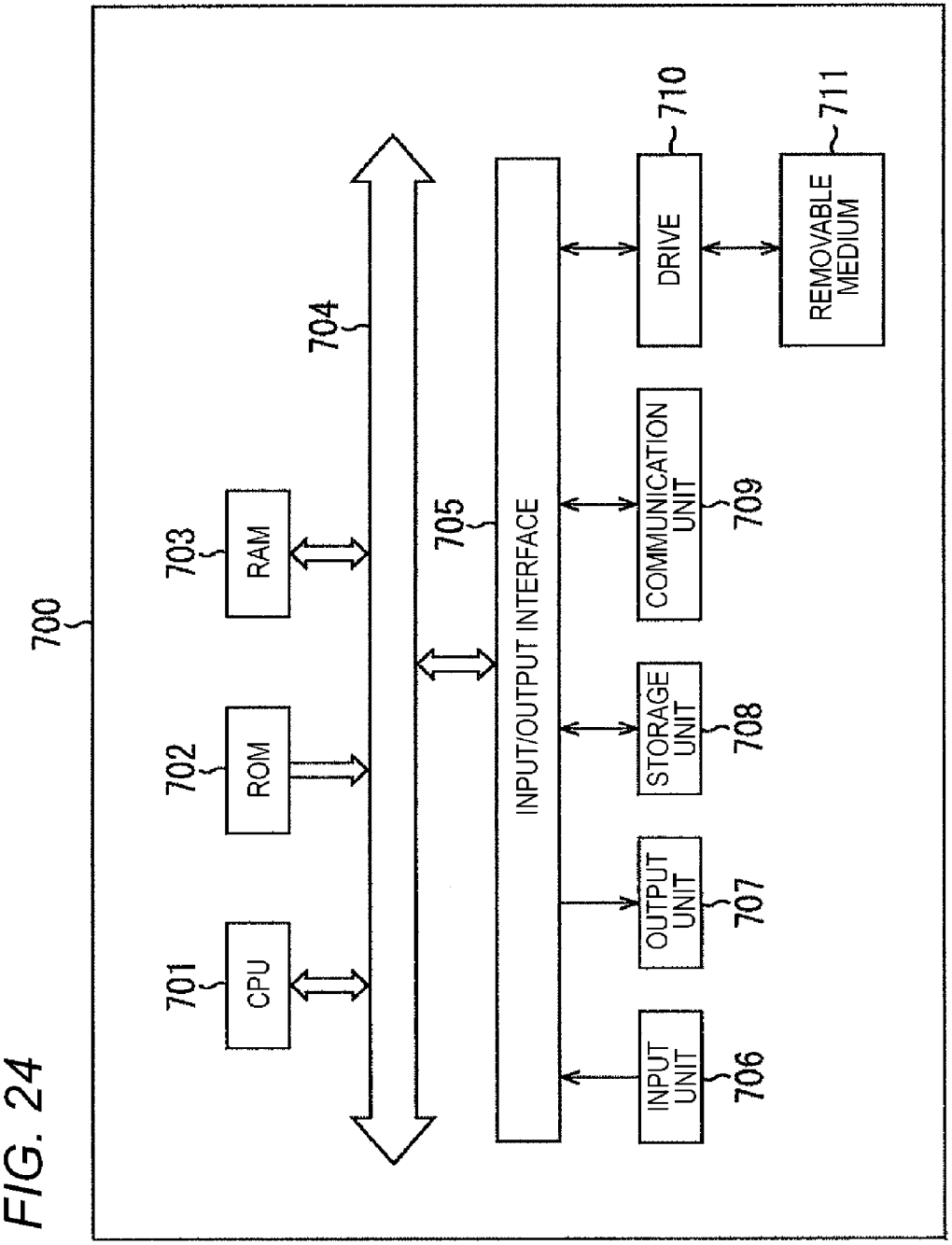
FIG. 24 is a block diagram showing a configuration example of a personal computer.

In FIG. 24, a CPU (Central Processing Unit) 701 performs various processes according to programs stored in a ROM (Read Only Memory) 702 or programs loaded into a RAM (Random Access Memory) 703 from a storage unit 708. In the RAM 703, data necessary for the CPU 701 to perform various processes is stored as needed.

The CPU 701, the ROM 702, and the RAM 703 are connected to each other through a bus 704. An input/output interface 705 is further connected to the bus 704.

An input unit 706 including a keyboard and a mouse, an output unit 707 including a display such as an LCD (Liquid Crystal display) and a speaker, a storage unit 708 including a hard disk, and a communication unit 709 including a modem and a network interface card such as a LAN card are connected to the input/output interface 705. The communication unit 709 performs a communication process through a network including the Internet.

A drive 710 is further connected to the input/output interface 705 as necessary, a removable medium 711 such as a magnetic disk, an optical disk, a magnet-optical disk, or a semiconductor memory is attached to the drive 710 as needed, and a computer program read from the removable medium 711 is installed in the storage unit 708 as necessary.

When the series of processes described above are performed by software, programs included in the software are installed from a network such as the Internet or from a recording medium including the removable medium 711 or the like.

The recording medium is not only the removable medium 711 shown in FIG. 24 such as a magnetic disk (including a floppy disk (registered trademark)), an optical disk (including a CD-ROM (Compact Disk-Read Only Memory) and a DVD (Digital Versatile Disk)), a magnet-optical disk (including an MD (Mini-Disk) (registered trademark)), and a semiconductor memory, which stores programs and which is distributed to deliver the programs to a user separately from the device main body, but also the ROM 702 and the hard disk included in the storage unit 708, which record programs and which are delivered to the user in a state in which they are installed in the device main body in advance.

The series of processes described in the present description include not only processes performed in time series according to the order of the description but also processes that are not necessarily performed in time series but performed in parallel or individually.

Further, the embodiment of the present technology is not limited to the embodiment described above but can be variously modified without departing from the scope of the present technology.

The following configurations are also possible for the present technology:

(1)

An image processing device including:

a motion detector that detects motion of cultured myocardial cells for each partial area in an observation area on the basis of a picked-up image;

a motion amount calculator that calculates an amount of motion of each detected motion; and a propagation information calculator that calculates a propagation speed and a propagation direction of the motion for each pulsation of the cultured myocardial cells on the basis of waveform information representing a variation over time of each calculated amount of motion.

(2)

The image processing device described in the item (1), in which the motion detector detects the motion for each partial area in each frame of a moving image in the observation area, and the propagation information calculator generates waveform information representing pulsation of the cultured myocardial cells in the partial area on the basis of the amount of motion for each partial area in a plurality of frames of the moving image.

(3)

The image processing device described in the item (2), in which the propagation information calculator calculates the propagation speed and the propagation direction for each pulsation by comparing a time corresponding to a feature point set in advance in a waveform of the waveform information in a predetermined partial area with a time corresponding to a feature point set in advance in a waveform of the waveform information in another partial area.

(4)

The image processing device described in any one of the items (1) to (3), which further includes an evaluation unit that calculates an evaluation value evaluating stability over a plurality of pulsations of the cultured myocardial cells in the entire observation area.

(5)

The image processing device described in the item (4), in which the evaluation unit evaluates at least any one of a degree of distribution of the propagation direction and the propagation speed of the pulsation, smallness of a difference between a maximum value and a minimum value of the propagation direction and the propagation speed of the pulsation, and a degree at which the propagation speed is within a certain range.

(6)

The image processing device described in any one of the items (1) to (5), which further includes a display unit that visualizes and displays a state of the propagation of the pulsation.

(7)
The image processing device described in the item (6), in which
the display unit displays the propagation of the pulsation as isochrones.
(8)
The image processing device described in the item (6), in which the display unit displays the propagation of the pulsation as a histogram.
(9)
The image processing device described in the item (6), in which the display unit displays the propagation speed and the propagation direction for each pulsation in association with a waveform representing the pulsation.
(10)
The image processing device described in the item (6), in which
the display unit displays transition over time of an evaluation value evaluating stability of the pulsation.
(11)
An image processing method including:
detecting motion of cultured myocardial cells for each partial area in an observation area on the basis of a picked-up image by a motion detector;
calculating an amount of motion of each detected motion by a motion amount calculator; and
calculating a propagation speed and a propagation direction of the motion for each pulsation of the cultured myocardial cells on the basis of a waveform representing each calculated amount of motion by a propagation information calculator.
(12)
A program causing a computer to function as an image processing device, the image processing device including:
a motion detector that detects motion of cultured myocardial cells for each partial area in an observation area on the basis of a picked-up image;
a motion amount calculator that calculates an amount of motion of each detected motion; and
a propagation information calculator that calculates a propagation speed and a propagation direction of the motion for each pulsation of the cultured myocardial cells on the basis of waveform information representing a variation over time of each calculated amount of motion.

(A)
An image processing device including:
processor circuitry configured to:
detect motion of objects in an observation area on the basis of a captured image;
calculate amounts of each detected motion; and
calculate at least one of a propagation speed and a propagation direction of the motion for pulsations of the objects.

(B)
The image processing device described in the item (A), wherein the object is selected from the group consisting of cultured myocardial cells, non-cultured myocardial cells, or a heart.

(C)
The image processing device described in the items (A) to (B), wherein the processor circuitry calculates at least one of the propagation speed and the propagation direction of the motion for pulsations of the objects based on waveform information representing a variation over time of each calculated amount of motion.

(D)
The image processing device described in the items (A) to (C), wherein the processor circuitry is configured to detect the motion for each of a plurality of partial areas in each frame of a moving image in the observation area, and the propagation information calculator generates waveform information representing pulsations of the objects in the respective partial areas on the basis of the amounts of motion for each partial area in a plurality of frames of the moving image.

(E)
The image processing device described in the items (A) to (D), wherein the processor circuitry is configured to calculate at least one of the propagation speed and the propagation direction for each pulsation by comparing a time corresponding to a feature point set in advance in a waveform of the waveform information in a predetermined partial area with a time corresponding to a feature point set in advance in a waveform of the waveform information in another partial area.

(F)
The image processing device described in the items (A) to (E), further comprising:
an evaluation unit that calculates an evaluation value evaluating stability over a plurality of pulsations of the objects in the entire observation area.

(G)
The image processing device described in the items (A) to (F), wherein the evaluation unit evaluates at least one selected from the group consisting of:
a degree of distribution of the propagation direction and the propagation speed of the pulsation;
a smallness of a difference between a maximum value and a minimum value of the propagation direction and the propagation speed of the pulsation; and
a degree at which the propagation speed is within a certain range.

(H)
The image processing device described in the items (A) to (G), wherein the processor circuitry is configured to cause a state of the propagation of the pulsation to be displayed on a display unit.

(I)
The image processing device described in the items (A) to (H), wherein the processor circuitry is configured to cause the propagation of the pulsation to be displayed as isochrones.

(J)
The image processing device described in the items (A) to (I), wherein the processor circuitry is configured to cause the propagation of the pulsation to be displayed as a histogram.

(K)
The image processing device described in the items (A) to (I), wherein the processor circuitry is configured to cause the propagation speed and the propagation direction for each pulsation to be displayed in association with a waveform representing the pulsation.

(L)
The image processing device described in the items (A) to (K), wherein the processor circuitry is configured to cause a transition over time of an evaluation value evaluating stability of the pulsation to be displayed.

(M)
The image processing device described in the items (A) to (L), wherein a pulsation of the object includes a contraction and an expansion of said object.

(N)

An image processing method comprising:

detecting motion of objects in an observation area on the basis of a captured image; calculating amounts of each detected motion; and calculating at least one of a propagation speed and a propagation direction of the motion for pulsations of the objects.

(O)

The image processing method described in the item (N), wherein a pulsation of the object includes a contraction and an expansion of said object.

(P)

A non-transitory computer readable storage medium storing a computer program for causing a computer to function as an image processing device, the image processing device comprising:

processor circuitry configured to:

detect motion of objects in an observation area on the basis of a captured image; calculate amounts of each detected motion; and calculate at least one of a propagation speed and a propagation direction of the motion for pulsations of the objects.

(Q)

The non-transitory computer readable storage medium described in the item (P), wherein a pulsation of the object includes a contraction and an expansion of said object.

REFERENCE SIGNS LIST

101 image pickup unit
102 evaluation target image data generation recording unit
103 evaluation index data generation unit
104 evaluation unit
105 display unit
121 motion detector
122 motion amount calculator
123 propagation information calculator

The invention claimed is:

1. An image processing device comprising:
processor circuitry configured to:
detect motion of objects in an observation area on the basis of a captured image;
calculate amounts of each detected motion;
calculate at least one of a propagation speed and a propagation direction of the motion for pulsations of the objects based on waveform information representing a variation over time of each calculated amount of motion, the propagations speed and the propagation direction for each pulsation being displayed in association with the waveform representing the pulsation; and
calculate a stability of pulsations of the objects based on a weighted sum of at least a distribution value of average propagation speeds, a distribution value of average propagation directions, and a value indicative of a degree to which an average value of the propagation speed is within a predetermined range defined by an upper and a lower threshold, the average propagation speeds and the average propagation directions being determined from the propagation speed and propagation direction of the motion calculated by the processor circuitry.

2. The image processing device according to claim 1, wherein the object is selected from the group consisting of cultured myocardial cells, non-cultured myocardial cells, or a heart.

3. The image processing device according to claim 1, wherein the processor circuitry is configured to detect the motion for each of a plurality of partial areas in each frame of a moving image in the observation area, and to generate waveform information representing pulsations of the objects in the respective partial areas on the basis of the amounts of motion for each partial area in a plurality of frames of the moving image.

4. The image processing device according to claim 3, wherein the processor circuitry is configured to calculate at least one of the propagation speed and the propagation direction for each pulsation by comparing a time corresponding to a feature point set in advance in a waveform of the waveform information in a predetermined partial area with a time corresponding to a feature point set in advance in a waveform of the waveform information in another partial area.

5. The image processing device according to claim 1, wherein the processor circuitry calculates the stability of pulsations over a plurality of pulsations of the objects in an entire observation area.

6. The image processing device according to claim 5, wherein at least one of the following is also used in the weighted sum to determine the stability of pulsations:
a smallness of a difference between a maximum value and a minimum value of the propagation direction and the propagation speed of the pulsation.

7. The image processing device according to claim 1, wherein the processor circuitry is configured to cause a state of the propagation of the pulsation to be displayed on a display.

8. The image processing device according to claim 7, wherein the processor circuitry is configured to cause the propagation of the pulsation to be displayed as isochrones.

9. The image processing device according to claim 7, wherein the processor circuitry is configured to cause the propagation of the pulsation to be displayed as a histogram.

10. The image processing device according to claim 7, wherein the processor circuitry is configured to cause the propagation speed and the propagation direction for each pulsation to be displayed in association with a waveform representing the pulsation.

11. The image processing device according to claim 7, wherein the processor circuitry is configured to cause a transition over time of an evaluation value evaluating stability of the pulsation to be displayed.

12. The image processing device according to claim 1, wherein a pulsation of the object includes a contraction and an expansion of said object.

13. An image processing method comprising:
detecting, with circuitry, motion of objects in an observation area on the basis of a captured image;
calculating, with the circuitry, amounts of each detected motion;
calculating, with the circuitry, at least one of a propagation speed and a propagation direction of the motion for pulsations of the objects based on waveform information representing a variation over time of each calculated amount of motion, the propagations speed and the propagation direction for each pulsation being displayed in association with the waveform representing the pulsation; and calculating, with the circuitry, a stability of pulsations of the objects based on a weighted sum of at least a distribution value of average propagation speeds, a distribution value of average propagation directions, and a value indicative of a degree to which an average value of the propagation speed is within a predetermined range defined by an upper and a lower threshold, the average propagation speeds and the average propagation directions being determined from the propagation speed and propagation direction of the motion calculated.

14. The image processing method according to claim 13, wherein a pulsation of the object includes a contraction and an expansion of said object.

15. A non-transitory computer readable storage medium storing a computer program for causing a computer to function as an image processing device, the image processing device comprising:
processor circuitry configured to:
  detect motion of objects in an observation area on the basis of a captured image;
  calculate amounts of each detected motion;
  calculate at least one of a propagation speed and a propagation direction of the motion for pulsations of the objects based on waveform information representing a variation over time of each calculated amount of motion, the propagations speed and the propagation direction for each pulsation being displayed in association with the waveform representing the pulsation; and
calculating a stability of pulsations of the objects based on a weighted sum of at least a distribution value of average propagation speeds, a distribution value of average propagation directions, and a value indicative of a degree to which an average value of the propagation speed is within a predetermined range defined by an upper and a lower threshold, the average propagation speeds and the average propagation directions being determined from the propagation speed and propagation direction of the motion calculated.

16. The non-transitory computer readable storage medium according to claim 15, wherein a pulsation of the object includes a contraction and an expansion of said object.

* * * * *